United States Patent
Takamura et al.

(10) Patent No.: US 9,938,421 B2
(45) Date of Patent: *Apr. 10, 2018

(54) SET OF INK AND PRINT MEDIUM, INKJET PRINTING METHOD, INKJET PRINTING APPARATUS, PRINTED MATTER, INK, AND INK STORED CONTAINER

(71) Applicant: Ricoh Company, Ltd., Tokyo (JP)

(72) Inventors: Yukiko Takamura, Wakayama (JP); Hiroshi Gotou, Shizuoka (JP); Yuuki Yokohama, Kanagawa (JP); Hiromi Sakaguchi, Kanagawa (JP); Keita Katoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/217,316

(22) Filed: Jul. 22, 2016

(65) Prior Publication Data

US 2017/0022381 A1    Jan. 26, 2017

(30) Foreign Application Priority Data

Jul. 24, 2015  (JP) ................................. 2015-146913
Jul. 20, 2016  (JP) ................................. 2016-141957

(51) Int. Cl.

| C09D 11/322 | (2014.01) |
|---|---|
| C09D 11/36 | (2014.01) |
| C09D 11/102 | (2014.01) |
| B41J 2/175 | (2006.01) |
| C09D 11/54 | (2014.01) |

(52) U.S. Cl.
CPC ......... *C09D 11/102* (2013.01); *B41J 2/17523* (2013.01); *B41J 2/17536* (2013.01); *B41J 2/17553* (2013.01); *C09D 11/322* (2013.01); *C09D 11/36* (2013.01); *C09D 11/54* (2013.01)

(58) Field of Classification Search
CPC .............................. C09D 11/322; C09D 11/36
USPC ....................... 106/31.6, 31.65, 31.85, 31.86
See application file for complete search history.

(56) References Cited

U.S. PATENT DOCUMENTS

| 8,382,271 | B2 | 2/2013 | Goto et al. |
| 8,393,724 | B2* | 3/2013 | Imamura ............... C09D 11/322 |
| | | | 106/31.13 |
| 8,486,185 | B2 | 7/2013 | Kudoh et al. |
| 8,651,650 | B2 | 2/2014 | Matsuyama et al. |
| 8,746,869 | B2 | 6/2014 | Matsuyama et al. |

(Continued)

FOREIGN PATENT DOCUMENTS

| JP | 2007-076033 | 3/2007 |
| JP | 2013-248883 | 12/2013 |
| JP | 2014-198824 | 10/2014 |

*Primary Examiner* — Bruce H Hess
(74) *Attorney, Agent, or Firm* — Oblon, McClelland, Maier & Neustadt, L.L.P.

(57) ABSTRACT

Provided is a set of an ink and a print medium, the set including an ink and a print medium, wherein the ink includes at least one organic solvent, polyurethane resin particles, a colorant, and water, wherein the at least one organic solvent includes a compound having a saturated vapor pressure at 100° C. of 65 mmHg or greater but 400 mmHg or less, and wherein a sensor output at a critical image peeling point, measured by a microscratching method, of a solid image formed on the print medium in a manner that the ink is attached in an amount of 0.96 mg/cm$^2$ is 600 or greater.

12 Claims, 6 Drawing Sheets

(56) References Cited

U.S. PATENT DOCUMENTS

| | | |
|---|---|---|
| 8,857,962 B2 | 10/2014 | Goto et al. |
| 8,883,275 B2 | 11/2014 | Nagashima et al. |
| 8,961,674 B2 | 2/2015 | Fujii et al. |
| 9,011,588 B2 | 4/2015 | Fujii et al. |
| 9,028,600 B2 | 5/2015 | Goto et al. |
| 9,085,706 B2 | 7/2015 | Gotou et al. |
| 9,109,129 B2 | 8/2015 | Goto et al. |
| 9,169,407 B2 | 10/2015 | Yokohama et al. |
| 9,249,323 B2 | 2/2016 | Fujii et al. |
| 9,296,204 B2 | 3/2016 | Gotou |
| 2012/0207983 A1 | 8/2012 | Matsuyama et al. |
| 2013/0065028 A1 | 3/2013 | Fujii et al. |
| 2013/0070017 A1 | 3/2013 | Fujii et al. |
| 2013/0071637 A1 | 3/2013 | Matsuyama et al. |
| 2013/0155145 A1 | 6/2013 | Gotou et al. |
| 2013/0176369 A1 | 7/2013 | Gotou et al. |
| 2013/0194343 A1 | 8/2013 | Yokohama et al. |
| 2013/0194344 A1 | 8/2013 | Yokohama et al. |
| 2013/0293629 A1 | 11/2013 | Niino et al. |
| 2013/0323474 A1 | 12/2013 | Gotou et al. |
| 2014/0368572 A1 | 12/2014 | Goto |
| 2015/0035896 A1 | 2/2015 | Gotou et al. |
| 2015/0077480 A1 | 3/2015 | Fujii et al. |
| 2015/0079358 A1 | 3/2015 | Gotou et al. |
| 2015/0103116 A1 | 4/2015 | Gotou |
| 2015/0283828 A1 | 10/2015 | Aoai et al. |
| 2015/0307729 A1 | 10/2015 | Gotou et al. |
| 2015/0361282 A1 | 12/2015 | Nakagawa et al. |

\* cited by examiner

SET OF INK AND PRINT MEDIUM, INKJET PRINTING METHOD, INKJET PRINTING APPARATUS, PRINTED MATTER, INK, AND INK STORED CONTAINER

CROSS-REFERENCE TO RELATED APPLICATIONS

The present application claims priority under 35 U.S.C. § 119 to Japanese Patent Application No. 2015-146913 filed Jul. 24, 2015 and Japanese Patent Application No. 2016-141957 filed Jul. 20, 2016. The contents of which are incorporated herein by reference in their entirety.

BACKGROUND OF THE INVENTION

Field of the Invention

The present invention relates to a set of an ink and a print medium, an inkjet printing method, an inkjet printing apparatus, a printed matter, an ink, and an ink stored container.

Description of the Related Art

Hitherto, it has been common that inks used in inkjet printing methods contain colorants, organic solvents, and water. Dyes have been mainly used as the colorants because of an excellent chromogenic property and an excellent stability. However, images obtained with dye inks are insufficient durabilities such as light resistance and water resistance. The durabilities have improved to some degree along with improvement of dedicated inkjet printing paper having an ink absorbing layer. However, the durabilities on plain paper have not become satisfactory.

In recent years, pigment inks using pigments as colorants have come to be used. The pigment inks have been largely improved in image durabilities such as light resistance and water resistance, in which the dye inks lack. However, the pigment inks have a problem of imparting a poor glossiness because light interference occurs between different wavelengths or phases due to, for example, multiple reflection of light in the pigments.

Moreover, images obtained with the pigment inks may stain print media, because it is difficult for the pigments to fix on print media. This results in a poor scratch resistance of the images when the images are scratched with a finger or paper. Particularly, the pigments in the inks are more likely to remain on a surface of print media such as coated paper into which inks are not so easily absorbed as into plain paper. This results in a considerably poor scratch resistance.

In order to overcome the problems, there is proposed an ink intended for improving scratch resistance by containing, for example, polycarbonate polyurethane resin particles to form a hard ink coating film having a surface hardness of 100 N/mm$^2$ or greater (see, e.g., Japanese Unexamined Patent Application Publication No. 2014-198824).

There is also a proposal for adding two kinds of resins having low and different glass transition temperatures (Tg) in an ink to improve a film forming property of an ink image and improve a film strength of a film formed (see, e.g., Japanese Unexamined Patent Application Publication No. 2007-76033).

SUMMARY OF THE INVENTION

According to one aspect of the present invention, a set of an ink and a print medium is provided. The set includes an ink and a print medium. The ink includes at least one organic solvent, polyurethane resin particles, a colorant, and water. The at least one organic solvent includes a compound having a saturated vapor pressure at 100° C. of 65 mmHg or greater but 400 mmHg or less. A sensor output at a critical image peeling point, measured by a microscratching method, of a solid image formed on a print medium in a manner that the ink is attached in an amount of 0.96 mg/cm$^2$ is 600 or greater.

DESCRIPTION OF THE EMBODIMENTS (Ink)

Figure 1A:
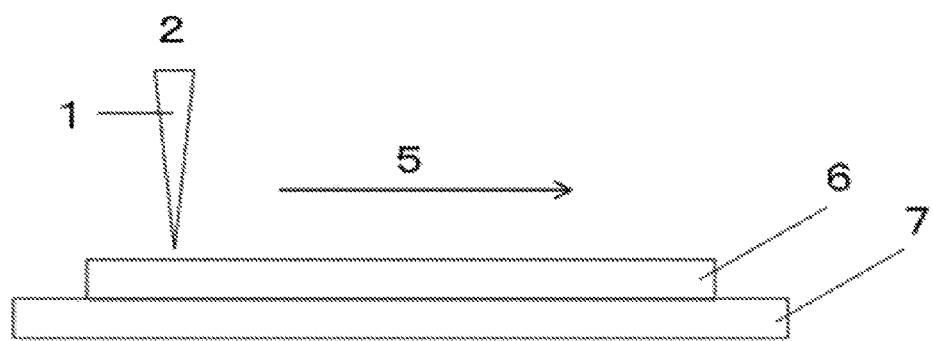
FIG. 1A is an exemplary diagram illustrating how a sensor output at a critical image peeling point is measured by a microscratching method.

An ink of the present invention includes at least one organic solvent, polyurethane resin particles, a colorant, and water.

The at least one organic solvent includes a compound having a saturated vapor pressure at 100° C. of 65 mmHg or greater but 400 mmHg or less.

A sensor output at a critical image peeling point, measured by a microscratching method, of a solid image formed on a print medium in a manner that the ink is attached in an amount of 0.96 mg/cm$^2$ is 600 or greater.

The ink further includes other components as needed.

Moreover, image forming, recording, printing, etc. in the present disclosure represent the same meaning.

The ink of the present invention is based on a finding that the ink described in Japanese Unexamined Patent Application Publication No. 2014-198824 cannot sufficiently satisfy scratch resistance of an image, when an ink coating film formed by the ink has an excessively high surface hardness and hence exhibits a hard, brittle nature.

The ink of the present invention is also based on findings from the ink described in Japanese Unexamined Patent Application Publication No. 2007-76033 that the ink has an extremely low minimum filming temperature and hence a high filming speed during an image drying process to make it difficult for a uniform film to be formed and hence for a sufficient scratch resistance and a sufficient image glossiness to be achieved, that the low minimum filming temperature of the ink leads a head nozzle to be filmed with the ink at a meniscus portion of the nozzle if the nozzle is left to stand for a long time without being capped, to degrade a maintenance property, and that the resins express tackiness when the resins have extremely low glass transition temperatures, to make blocking likely to occur when images are wound around a roll or stacked after the images are printed and ejected.

The present invention has an object to provide an ink that is capable of forming an image having an excellent scratch resistance, an excellent glossiness, and a high image density, and is excellent in a blocking property and a nozzle maintenance property.

The present invention can provide an ink that is capable of forming an image having an excellent scratch resistance, an excellent glossiness, and a high image density, and is excellent in a blocking property and a nozzle maintenance property.

As a result of earnest studies for overcoming a poor scratch resistance due to remaining of a pigment on a surface of coated paper for printing (coat paper) into which an ink is not easily absorbed, the present inventors have found that a solid image formed on a print medium with an ink containing polyurethane resin particles in a manner that the ink is attached in an amount of 0.96 mg/cm$^2$ has an improved scratch resistance when a sensor output at a critical image peeling point, measured by a microscratching method, of the solid image is 600 or greater.

The polyurethane resin particles have a high polarity and a strong cohesive force and are hence considered capable of forming an ink coating film more uniformly than resin particles having a different composition and advantageous for improving scratching resistance, but on the other hand, easily take in water or an organic solvent contained in the ink and impart a poor driability to an image. The present inventors have found however that addition of a compound having a saturated vapor pressure at 100° C. of 65 mmHg or greater but 400 mmHg or less in an ink as an organic solvent can improve driability of an image even when the ink contains the polyurethane resin particles and can improve resistance to blocking that may occur when the image is wound up around a roll or stacked.

In the present invention, a sensor output at a critical image peeling point, measured by a microscratching method, of a solid image formed on a print medium in a manner that the ink is attached in an amount of 0.96 mg/cm$^2$ is 600 or greater, preferably 600 or greater but 1,000 or less, and more preferably 620 or greater but 850 or less.

When the sensor output is 600 or greater, filming by the polyurethane resin particles has developed in an efficient manner in an ink coating film after printing, to provide the ink coating film with a high attaching strength and make the ink coating film less scrapable by friction.

—Measurement of Sensor Output at Critical Image Peeling Point by Microscratching Testing Method—

In the microscratching testing method, a sensor output at a critical image peeling point can be measured in the manner described below (according to JIS R3255-1997 "A method for testing attachability of a thin film on a glass substrate").

With an inkjet printer (e.g., IPSIO GX5500 available from Ricoh Company Ltd.) that is loaded with the ink, a solid image is formed on a print medium, which is coat paper (e.g., LUMI ART GLOSS 130GSM PAPER available from Stora Enso Oyj), in a manner that a resolution is 1,200 dpi and the ink is attached in an amount of 0.96 mg/cm$^2$ (600 mg/A4-size sheet). Subsequently, the solid image is dried in a thermostat bath set to an internal temperature of 100° C. for 30 seconds. The dried solid image is measured with a microscratching tester (CSR-2000 available from Rhesca Corporation) under the conditions described below, to read a sensor output at a critical image peeling point (which is a point at which the solid image peels). The measurement is performed once, and the position to be measured is the center of the solid image.

(1) Instrument used: CSR-2000 available from Rhesca Corporation (2) Measurement conditions
Scratching speed: 20 μm/s
Measurement time 30 seconds
Load when the measurement ends: 10 mN
Amplitude level: 100 μm
Exciting frequency: 45 Hz
Data sampling: 3,735 Hz
Spring constant: 100 g/mm
Stylus (diamond needle) diameter: 5 μm The print medium is not particularly limited and may be appropriately selected depending on the intended purpose. Examples of the print medium include plain paper, coated paper for printing, gloss paper, special paper, cloth, films, and OHP sheets. Among these print media, coated paper for printing is preferable.

The microscratching method employs a detecting mechanism used in a record needle cartridge. The principle of the microscratching method is as follows. A diamond needle is provided at a leading end of a cantilever. While scanning an ink coating film of a solid image, the diamond needle can sense minute changes in the surface of the solid image with a high sensitivity. Vibration of the tip of the diamond needle is transmitted through the cantilever, converted to an electric signal in the cartridge, and taken in. As the scratching load is incremented during scanning, the ink coating film of the solid image peels from the print medium (a critical image peeling point). A value corresponding to a force applied to the diamond needle at the critical image peeling point is displayed as a sensor output (according to JIS R3255-1997 "A method for testing attachability of a thin film on a glass substrate"). It can be said that a greater sensor output means a firmer image with a hardly peelable ink coating film.

Figure 1B:
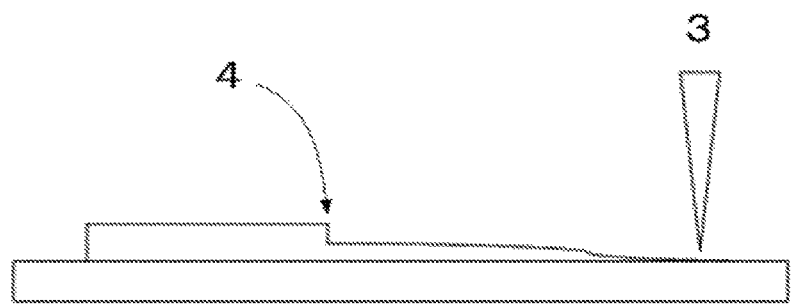
FIG. 1B is an exemplary diagram illustrating how a sensor output at a critical image peeling point is measured by a microscratching method.

A measuring method according to the microscratching method will be described with reference to FIG. 1A and FIG. 1B. With a scratching load that is incremented, a diamond needle 1 is scanned across a solid image 6 that is formed on a print medium 7 in a manner that a resolution is 1,200 dpi and an ink is attached in an amount of 0.96 mg/cm$^2$ (600 mg/A4-size sheet), in a direction (a scratching direction 5) which the diamond needle 1 moves from a starting point 2 to an ending point 3 on the solid image 6. When a scratching load greater than or equal to a certain level is applied to the solid image 6, the ink coating film of the solid image 6 becomes unable to endure the scratching load and peels from the print medium 7 due to internal peeling in the ink coating film. This timing is a critical image peeling point 4. A value corresponding to a force applied to the diamond needle 1 at the critical image peeling point 4 is read as a sensor output.

—Measurement of Arithmetic Mean Roughness Ra of Image—

An arithmetic mean roughness Ra of a solid image formed on a print medium in a manner that the ink is attached in an amount of 0.96 mg/cm$^2$ is preferably 0.2 μm or greater but 0.9 μm or less and more preferably 0.3 μm or greater but 0.8 μm or less.

When the arithmetic mean roughness Ra of the solid image is 0.2 μm or greater but 0.9 μm or less, filming by the polyurethane resin particles has developed in an efficient manner to improve adhesiveness between the colorant and the polyurethane resin film, to make the colorant less likely to peel from the solid image when a surface of the solid image is scratched and improve scratch resistance. Furthermore, the surface of the image is uniform, to improve glossiness and image density.

The arithmetic mean roughness Ra of an image can be measured in the manner described below, for example.

With an inkjet printer (e.g., IPSIO GX5500 available from Ricoh Company Ltd.) that is loaded with the ink, a solid image is formed on a print medium, which is coat paper (e.g., LUMI ART GLOSS 130GSM PAPER available from Stora Enso Oyj), in a manner that a resolution is 1,200 dpi and the ink is attached in an amount of 0.96 mg/cm$^2$ (600 mg/A4-size sheet). Subsequently, the solid image is dried in a thermostat bath set to an internal temperature of 100° C. for 30 seconds.

Next, an arithmetic roughness of the dried solid image is measured with a laser microscope (e.g., VK-850 available from Keyence Corporation) under a condition that a measuring pitch is 0.1 μm. A vertically 0.4 mm-depth region of the solid image is scanned 10 times, and an average of the measurements is calculated as the arithmetic mean roughness Ra.

As the print medium, it is possible to use the same print medium as the print medium that is used in the measurement of the sensor output at the critical image peeling point according to the microscratching testing method.

<Polyurethane Resin Particles>

The polyurethane resin particles have a high polarity and a strong cohesive force. Therefore, the polyurethane resin particles can form an ink coating film more uniformly and more firmly than any other resin particles and can improve scratch resistance of an image.

The polyurethane resin particles are not particularly limited and may be appropriately selected depending on the intended purpose. For example, the polyurethane resin particles can be obtained by allowing polyol and polyisocyanate to undergo a reaction.

Examples of the polyol include polyether polyols, polycarbonate polyols, and polyester polyols. One of these polyols may be used alone or two or more of these polyols may be used in combination.

—Polyether Polyol—

Examples of the polyether polyol include a polyether polyol obtained by polymerizing a starting material through addition of an alkylene oxide. The starting material is at least one kind of a compound containing 2 or more active hydrogen atoms.

Examples of the starting material include ethylene glycol, diethylene glycol, triethylene glycol, propylene glycol, trimethylene glycol, 1,3-butanediol, 1,4-butanediol, 1,6-hexanediol, glycerin, trimethylolethane, and trimethylolpropane. One of these starting materials may be used alone or two or more of these starting materials may be used in combination.

Examples of the alkylene oxide include ethylene oxide, propylene oxide, butylene oxide, styrene oxide, epichlorohydrin, and tetrahydrofuran. One of these alkylene oxides may be used alone or two or more of these alkylene oxides may be used in combination.

Examples of the polyether polyol for obtaining a binder for an ink capable of imparting an extraordinarily excellent scratch resistance include polyoxytetramethylene glycols and polyoxypropylene glycols. One of these polyether polyols may be used alone or two or more of these polyether polyols may be used in combination.

—Polycarbonte Polyol—

Examples of the polycarbonate polyol that can be used for producing the polyurethane resin particles include polycarbonate polyols obtained through a reaction between carbonate ester and polyol and polycarbonate polyols obtained through a reaction between phosgene and, for example, bisphenol A. One of these polycarbonate polyols may be used alone or two or more of these polycarbonate polyols may be used in combination.

Examples of the carbonate ester include methyl carbonate, dimethyl carbonate, ethyl carbonate, diethyl carbonate, cyclocarbonate, and diphenyl carbonate. One of these carbonate esters may be used alone or two or more of these carbonate esters may be used in combination.

Examples of the polyol include: dihydroxy compounds having a relatively low molecular weight such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7-hepetanediol, 1,8-octanediol, 1,9-nonanediol, 1,10-decanediol, 1,11-undecanediol, 1, 12-dodecanediol, 1,4-cyclohexanediol, 1,4-cyclohexanedimethanol, hydroquinone, resorcin, bisphenol-A, bisphenol-F, and 4,4'-biphenol; polyether polyols such as polyethylene glycols, polypropylene glycols, and polyoxytetramethylene glycols; and polyester polyols such as polyhexamethylene adipates, polyhexamethylene succinates, and polycaprolactones. One of these polyols may be used alone or two or more of these polyols may be used in combination.

—Polyester Polyols—

Examples of the polyester polyol include polyester polyols obtained by allowing a low-molecular-weight polyol and a polycarboxylic acid to undergo an esterification reaction, polyesters obtained by allowing a cyclic ester compound such as ε-caprolactone to undergo a ring-opening polymerization reaction, and copolymerized polyesters of these polyesters. One of these polyester polyols may be used alone or two or more of these polyester polyols may be used in combination.

Examples of the low-molecular-weight polyol include ethylene glycol and propylene glycol. One of these low-molecular-weight polyols may be used alone or two or more of these low-molecular-weight polyols may be used in combination.

Examples of the polycarboxylic acid include succinic acid, adipic acid, sebacic acid, dodecanedicarboxylic acid, terephthalic acid, isophthalic acid, phthalic acid, and anhydrides or ester-forming derivatives of these acids. One of these polycarboxylic acids may be used alone or two or more of these polycarboxylic acids may be used in combination.

—Polyisocyanate—

Examples of the polyisocyanate include: aromatic diisocyanates such as phenylene diisocyanate, tolylene diisocyanate, diphenylmethane diisocyanate, and naphthalene diisocyanate; and aliphatic or alicyclic diisocyanates such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, and 2,2,4-trimethylhexamethylene diisocyanate. One of these polyisocyanates may be used alone or two or more of these polyisocyanates may be used in combination. Among these polyisocyanates, aliphatic or alicyclic diisocyanates are preferable in terms of weather resistance over a long period of time, because the ink of the present invention will be used also for outdoor use such as a poster or a signage, so that the ink needs to form a coating film having a very high weather resistance over a long period of time.

Additional use of at least one alicyclic diisocyanate makes it easier to obtain an intended coating film strength and an intended scratch resistance.

Examples of the alicyclic diisocyanate include isophorone diisocyanate and dicyclohexylmethane diisocyanate.

A content of the alicyclic diisocyanate is preferably 60% by mass or greater of a total amount of isocyanate compounds.

—Method for Producing Polyurethane Resin Particles—

The polyurethane resin particles are not particularly limited and can be obtained according to producing methods hitherto commonly used.

First, in the absence of a solvent or in the presence of an organic solvent, the polyol is allowed to react with the polyisocyanate in an equivalent ratio so that isocyanate groups are excessively present, to produce an isocyanate-terminated urethane prepolymer.

Next, anionic groups in the isocyanate-terminated urethane prepolymer are neutralized with a neutralizing agent as needed and allowed to react with a chain extender. Finally, the organic solvent in the system is removed as needed. As a result, the polyurethane resin particles are obtained.

Examples of the organic solvent that can be used for producing the polyurethane resin particles include: ketones such as acetone and methyl ethyl ketone; ethers such as tetrahydrofuran and dioxane; acetic acid esters such as ethyl acetate and butyl acetate; nitriles such as acetonitrile; and amides such as dimethyl formamide, N-methylpyrrolidone, and N-ethylpyrrolidone. One of these organic solvents may be used alone or two or more of these organic solvents may be used in combination.

Examples of the chain extender include polyamines and other active hydrogen group-containing compounds.

Examples of the polyamines include: diamines such as ethylene diamine, 1,2-propane diamine, 1,6-hexamethylenediamine, piperazine, 2,5-dimethyl piperazine, isophoronediamine, 4,4'-dicyclohexylmethane diamine, and 1,4-cyclohexane diamine; polyamines such as diethylenetriamine, dipropylene triamine, and triethylene tetramine; hydrazines such as hydrazine, N,N'-dimethyl hydrazine, and 1,6-hexamethylene bishydrazine; and dihydrazides such as succinic dihydrazide, adipic dihydrazide, glutaric dihydrazide, sebacic dihydrazide, and isophthalic dihydrazide. One of these polyamines may be used alone or two or more of these polyamines may be used in combination.

Examples of the other active hydrogen group-containing compounds include glycols such as ethylene glycol, diethylene glycol, triethylene glycol, propylene glycol, 1,3-propanediol, 1,3-butanediol, 1,4-butanediol, hexamethylene glycol, saccharose, methylene glycol, glycerin, and sorbitol; phenols such as bisphenol A, 4,4'-dihyroxy diphenyl, 4,4'-dihydroxydiphenyl ether, 4,4'-dihydroxydiphenyl sulfone, hydrogenated bisphenol A, and hydroquinone; and water. One of these active hydrogen group-containing compounds may be used alone or two or more of these active hydrogen group-containing compounds may be used in combination.

Polycarbonate urethane resin particles are preferable as the polyurethane resin particles in terms of water resistance, heat resistance, wear resistance, weather resistance, and image scratch resistance that are based on a high cohesive force of a carbonate group. Use of the polycarbonate urethane resin particles makes it possible to obtain an ink suitable for a printed matter to be used in a severe environment such as outdoor.

In dispersing the polyurethane resin particles into an aqueous medium, a dispersant may be added for forced emulsification of the polyurethane resin particles. However, the dispersant may remain in an ink coating film to decrease a strength of the ink coating film. Hence, it is preferable to disperse the polyurethane resin particles through so-called self-emulsification, by providing the polyurethane resin particles with anionic groups in a structure of the polyurethane resin particles. In this case, in order to provide an excellent scratch resistance and an excellent chemical resistance, it is preferable that the polyurethane resin particles contain the anionic groups in a manner that an acid value is in a range of from 20 mgKOH/g through 100 mgKOH/g.

Examples of the anionic groups include a carboxyl group, a carboxylate group, a sulfonic group, and a sulfonate group. Among these anionic groups, a carboxylate group and a sulfonate group that are partially or totally neutralized with, for example, a basic compound are preferable from the viewpoint of maintaining good water-dispersion stability.

Examples of the basic compound that can be used for neutralizing the anionic groups include: organic amines such as ammonia, triethyl amine, pyridine, and morpholine; alkanol amines such as monoethanolamine; and metallic base compounds containing, for example, Na, K, Li, and Ca.

A weight average molecular weight of the polyurethane resin particles is not particularly limited and may be appropriately selected depending on the intended purpose, and is preferably in a range of from 5,000 through 500,000, more preferably in a range of from 10,000 through 400,000, and yet more preferably in a range of from 10,000 through 300,000 in terms of storage stability and dischargeability of the ink.

The weight average molecular weight (Mw) of the polyurethane resin particles can be measured with a gel permeation chromatography (GPC) measuring instrument (e.g., GPC-8220GPC available from Tosoh Corporation as the instrument, and 15 cm three continuous columns TSKGEL SUPER HZM-H available from Tosoh Corporation as columns).

A sample of the polyurethane resin particles to be measured is a filtrate obtained by making a 0.15% by mass solution of the polyurethane resin particles in tetrahydrofuran (THF) (containing a stabilizer, available from Wako Pure Chemical Industries, Ltd.) and filtrating the solution through a filter having an average pore diameter of 0.2 μm. The THF sample solution is injected into the measuring instrument in an amount of 100 μL and measured in an environment in which a temperature is 40° C. at a flow rate of 0.35 ml/min. A molecular weight of the sample is calculated based on a relationship between a count number and a logarithmic value on a calibration curve generated based on several kinds of monodisperse polystyrene standard samples. SHOWDEX STANDARD Std. Nos. S-7300, S-210, S-390, S-875, S-1980, S-10.9, S-629, S-3.0, and S-0.580 (all available from Showa Denko K.K.) are used as the polystyrene standard samples, and toluene is used as a diluent solvent. A refractive index (RI) detector is used as a detector.

A glass transition temperature (Tg) of the polyurethane resin particles is preferably −30° C. or higher but 10° C. or lower.

When the glass transition temperature of the polyurethane resin particles is −30° C. or higher but 10° C. or lower, the polyurethane resin particles have an excellent filming property and can form a uniform ink coating film. This cam prove scratch resistance of an image.

When the glass transition temperature of the polyurethane resin particles is −30° C. or higher, the polyurethane resin particles are less likely to express tackiness. This can suppress escalation of blocking due to addition of the polyurethane resin particles in the ink. Furthermore, it is less likely that a surface of a head nozzle in a decapped state is filmed with the polyurethane resin particles. This improves a nozzle maintenance property. When the glass transition temperature of the polyurethane resin particles is 10° C. or lower, the filming property of the polyurethane resin particles is improved. This is effective for improving scratch resistance of an image, improves glossiness, and can realize a high image density.

The glass transition temperature of the polyurethane resin particles can be obtained from an endothermic chart of a differential scanning calorimeter (e.g., Q2000 available from TA Instruments Japan). Specifically, a water content and a solvent contained in the polyurethane resin particles are evaporated. The dried, hardened polyurethane resin particles are weighed out in an amount in a range of from 5 mg through 10 g, loaded in a simple sealed pan formed of aluminium, and subjected to a measurement flow described below.

First heating: heating from 30° C. to 220° C. under a condition of 5° C./minute, and retention for 1 minute after reaching 220° C.

Cooling: quenching to −60° C. without temperature control, and retention for 1 minute after reaching −60° C.

Second heating: heating from −60° C. to 180° C. under a condition of 5° C./minute A value according to a midpoint method is read from a thermogram of the second heating as the glass transition temperature (ASTM D3418/82 available from ASTM International).

A volume average particle diameter of the polyurethane resin particles is preferably 8 nm or greater but 19 nm or less.

When the volume average particle diameter of the polyurethane resin particles is 8 nm or greater but 19 nm or less, an ink coating film becomes uniform on a surface of an image, and scratch resistance of the image can be improved. Furthermore, the polyurethane resin particles can be dispersed stably to improve storage stability of the ink.

When the volume average particle diameter of the polyurethane resin particles is 8 nm or greater, an ink coating film becomes uniform to provide a surface of an image with an adequate friction coefficient. This is advantageous for improving scratch resistance. When the volume average particle diameter is 19 nm or less, the polyurethane resin particles get stuck between pigment particles efficiently to improve uniformity of an ink coating film. This is effective for improving scratch resistance of an image and leads to improvement of glossiness and improvement of image density.

The volume average particle diameter of the polyurethane resin particles can be measured according to a dynamic light scattering method (e.g., with MICROTRAC UPA-150 available from Nikkiso Co., Ltd.) in an environment in which a temperature is 23° C. and a humidity is 55% RH. The volume average particle diameter means a 50% cumulative volume average particle diameter ($D_{50}$).

A ratio by mass (A/B) of a content A (% by mass) of the polyurethane resin particles to a content B (% by mass) of the colorant is preferably 1 or greater but 5 or less, more preferably 1 or greater but 4 or less, and yet more preferably 3 or greater but 4 or less.

When the ratio by mass (A/B) is 1 or greater but 5 or less, a uniform ink coating film is obtained, and scratch resistance of an image can be improved.

When the ratio by mass (A/B) is 1 or greater, it is easier for the colorant to be dispersed uniformly in a film of the polyurethane resin to make a surface of an ink coating film smooth. This is effective for improving scratch resistance, and can improve image density and a gloss level. When the ratio by mass (A/B) is 5 or less, it is possible to suppress escalation of blocking due to retention of an organic solvent in the polyurethane resin particles, and suppress degradation of a nozzle maintenance property due to filming on a surface of a decapped head nozzle.

<Organic Solvent>

As the organic solvent, the ink includes at least a compound having a saturated vapor pressure at 100° C. of 65 mmHg or greater but 400 mmHg or less.

When the saturated vapor pressure of the organic solvent at 100° C. is 65 mmHg or greater, a drying efficiency is remarkably improved. This is effective for improving image driability. When the saturated vapor pressure of the organic solvent at 100° C. is 400 mmHg or less, a moisture retaining effect of the organic solvent is adequate. This provides a favorable nozzle maintenance property (aspirability recovery).

In the present invention, addition of the polyurethane resin particles in the ink for improving scratch resistance and a gloss level leads to retention of water and an organic solvent in the ink due to the polarity of the polyurethane resin particles, to degrade image driability. As a result, when a printed image is ejected and then wound up around a roll or left stacked for a long time, there may occur a blocking phenomenon that images stick to each other or an image sticks to a print medium.

Hence, the compound having a saturated vapor pressure at 100° C. of 65 mmHg or greater but 400 mmHg or less is added in the ink. This enables even an ink containing polyurethane resin particles to effectively improve driability of a printed image and can suppress blocking.

Examples of the compound having a saturated vapor pressure at 100° C. of 65 mmHg or greater but 400 mmHg or less include propylene glycol monopropylether (with a saturated vapor pressure at 100° C. of 105 mmHg), propylene glycol monomethylether (with a saturated vapor pressure at 100° C. of 380 mmHg), 3-methoxybutanol (with a saturated vapor pressure at 100° C. of 92 mmHg), and ethylene glycol monobutylether (with a saturated vapor pressure at 100° C. of 68 mmHg). One of these compounds may be used alone or two or more of these compounds may be used in combination. Among these compounds, propylene glycol monopropylether, propylene glycol monomethylether, and 3-methoxybutanol are preferable because of capability of making the polyurethane resin particles spread uniformly on a surface of an image in a drying step to make it possible to form an image having scratch resistance, image density, and a high gloss level, and propylene glycol monopropylether and propylene glycol monomethylether are particularly preferable in terms of improving blocking resistance.

A content of the compound having a saturated vapor pressure at 100° C. of 65 mmHg or greater but 400 mmHg or less is preferably 10% by mass or greater but 25% by mass or less and more preferably 10% by mass or greater but 20% by mass or less of a total amount of the ink.

When the content of the compound having a saturated vapor pressure at 100° C. of 65 mmHg or greater but 400 mmHg or less is 10% by mass or greater, an image drying efficiency is remarkably improved. This is effective for suppressing blocking. When the content of the compound having a saturated vapor pressure at 100° C. of 65 mmHg or greater but 400 mmHg or less is 25% by mass or less, a moisture retaining effect of the organic solvent is adequate. This provides a favorable nozzle maintenance property (aspirability recovery).

A ratio by mass (C/A) of a content C (% by mass) of the compound having a saturated vapor pressure at 100° C. of 65 mmHg or greater but 400 mmHg or less to a content A (% by mass) of the polyurethane resin particles is preferably 0.85 or greater but 3.0 or less and more preferably 0.9 or greater but 2.5 or less.

When the ratio by mass (C/A) is 0.85 or greater, ink driability is improved, and hence blocking can be suppressed. When the ratio by mass (C/A) is 3.0 or less, the polyurethane resin particles are less swellable by the organic solvent. This makes it possible to suppress viscosity increase of the ink over time and provides the ink with a favorable storage stability.

The organic solvent can promote fixation of the colorant on a print medium more smoothly as a speed at which the organic solvent permeates the print medium after the ink is discharged onto the print medium from a head is higher. Therefore, an organic solvent having a higher permeating speed can realize an image having a high image quality without density unevenness. Hence, it is preferable to use a compound having a solubility parameter (SP value) in a range of from 11.0 through 14.0.

The SP value is a value defined based on the regular solution theory introduced by Hildebrand and functions as an indicator of solubility of a binary solution. The SP values presented in the present invention are values calculated according to a Fedors method and represented by a square root of a cohesive energy density defined in the regular solution theory. The unit of the SP values is $(J/cm^3)^{0.5}$. Typically, the SP values can be calculated with popular simple software.

Examples of the compound having a solubility parameter (SP value) in a range of from 11.0 through 14.0 include 3-ethyl-3-hydroxymethyloxetane (SP value: 11.31), 3-methyl-1,3-butanediol (SP value: 12.05), 1,2-butanediol (SP value: 12.75), 1,3-butanediol (SP value: 12.75), 1,4-butanediol (SP value: 12.95), 2,3-butanediol (SP value: 12.55), 1,2-propanediol (SP value: 13.48), 1,3-propanediol (SP value: 13.72), 1,2-hexanediol (SP value: 11.80), 1,6-hexanediol (SP value: 11.95), 3-methyl-1,5-pentanediol (SP value: 11.80), triethylene glycol (SP value: 12.12), and diethylene glycol (SP value: 13.02). One of these compounds may be used alone or two or more of these compounds may be used in combination. Among these compounds, 3-ethyl-3-hydroxymethyloxetane, 3-methyl-1,3-butanediol, 1,2-butanediol, 1,3-butanediol, 1,4-butanediol, 2,3-butanediol, 1,2-propanediol, and 1,3-propanediol are preferable.

As the organic solvent, any other compound may also be used in combination with the compound having a saturated vapor pressure at 100° C. of 65 mmHg or greater but 400 mmHg or less and the compound having a solubility parameter (SP value) in a range of from 11.0 through 14.0.

The any other organic solvent is not particularly limited and may be appropriately selected depending on the intended purpose. Examples of the any other organic solvent dude: polyvalent alcohols such as ethylene glycol, tetraethylene glycol, polyethylene glycol, dipropylene glycol, tripropylene glycol, polypropylene glycol, trimethylolethane, tri ethylolpropane, 1,5-pentanediol, hexylene glycol, glycerin, 1,2,3-butanetriol, 1,2,4-butanetriol, 1,2,6-hexanetriol, isopropylidene glycerol, and 3-methyl-1,3,5-pentanetriol; polyvalent alcohol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyvalent alcohol arylethers such as ethylene glycol monophenylether and ethylene glycol monobenzylether; nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone; amides such as formamides, N-methylformamide, N,N-dimethylformamide, 3-methoxy-N,N-dimethylpropionamide, and 3-butoxy-N,N-dimethylpropionamide; amines such as monoethanolamine, diethanolamine, triethanolamine, monoethylamine, diethylamine, and triethylamine; sulfur-containing compounds such as dimethylsulfoxide, sulfolane, and thiodiethanol; propylene carbonate; and ethylene carbonate. One of these organic solvents may be used alone or two or more of these organic solvents may be used in combination.

A content of the organic solvent (or a total content when two or more organic solvents are used) is preferably 15% by mass or greater but 60% by mass or less of the total amount of the ink.

When the content of the organic solvent is 15% by mass or greater, an image having an excellent glossiness and a high image density can be obtained. When the content of the organic solvent is 60% by mass or less, image qualities are favorable, and discharging stability is favorable with an adequate ink viscosity.

<Colorant>

The colorant is not particularly limited and may be appropriately selected depending on the intended purpose. Examples of the colorant include pigments and dyes. Among these colorants, pigments are preferable. Examples of the pigments include inorganic pigments and organic pigments.

Examples of the inorganic pigments include titanium oxide, iron oxide, calcium carbonate, barium sulfate, aluminium hydroxide, barium yellow, cadmium red, and chromium yellow, and carbon black produced by known methods such as a contact method, a furnace method, and a thermal method. One of these inorganic pigments may be used alone or two or more of these inorganic pigments may be used in combination.

Examples of the organic pigments include azo-pigments (e.g., azo lake, insoluble azo-pigments, condensed azo-pigments, and chelate azo-pigments), polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye-based chelates and acid dye-based chelates), nitro pigments, nitroso pigments, and aniline black. One of these organic pigments may be used alone or two or more of these organic pigments may be used in combination.

Other than these pigments, resin hollow particles and inorganic hollow particles may also be used.

Among these pigments, pigments having a high affinity with the organic solvent are preferable.

Specific examples of the pigments for black include: carbon black (C.I. Pigment Black 7) such as furnace black, lamp black, acetylene black, and channel black; metals such as copper, iron (C.I. Pigment Black 11), and titanium oxide; and organic pigments such as aniline black (C.I. Pigment Black 1). One of these pigments may be used alone or two or more of these pigments may be used in combination.

Specific examples of the pigments for colors include: C. I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, and 155; C. I. Pigment Orange 5, 13, 16, 17, 36, 43, and 51; C. I. Pigment Red 1, 2, 3, 5, 17, 22, 23, 31, 38, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (colcothar), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C. I. Pigment Violet 1 (Rhodamine Lake), 3, 5:1, 16, 19, 23, and 38; C. I. Pigment Blue 1, 2, 15 (Phthalocyanine blue), 15:1, 15:2, 15:3 (Phthalocyanine blue), 16, 17:1, 56, 60, and 63; and C. I. Pigment Green 1, 4, 7, 8, 10, 17, 18, and 36. One of these pigments may be used alone or two or more of these pigments may be used in combination.

It is preferable that the colorant be water-dispersible. A polymer emulsion obtained by adding a pigment to polymer particles can be used as the colorant. The polymer emulsion refers to a product obtained by adding a pigment to the polymer particles, and encompasses a product obtained by encapsulating a pigment in the polymer particles and a product obtained by adsorbing a pigment to a surface of the polymer particles. In this case, there is no need that all of the pigment particles be encapsulated or adsorbed, but the pigment may be dispersed in the emulsion in a range in which the effect of the present invention is not spoiled.

Examples of a polymer of the polymer emulsion formed by the polymer particles include vinyl-based polymers, polyester-based polymers, and polyurethane-based polymers. Among these polymers, vinyl-based polymers and polyester-based polymers are preferable.

Polymers disclosed in, e.g., Japanese Unexamined Patent Application Publication Nos. 2000-53897 and 2001-139849 may be used as the polymer.

In use of the polymer emulsion, it is preferable to use a common organic pigment or a composite pigment obtained by coating inorganic pigment particles with an organic pigment or carbon black.

The composite pigment can be produced by a method of depositing an organic pigment in the presence of inorganic pigment particles or a mechanochemical method of mechanically mixing and grinding an inorganic pigment and an organic pigment. Further, as needed, a layer of an organosilane compound produced from polysiloxane and alkylsilane may be provided between an inorganic pigment and an organic pigment. This makes it possible to improve adhesiveness between the inorganic pigment and the organic pigment.

A mass ratio between the inorganic pigment particles and the organic pigment or the carbon black is not particularly limited and may be appropriately selected depending on the intended purpose, but is preferably in a range of from 3:1 through 1:3 and more preferably in a range of from 3:2 through 1:2.

When the organic pigment or the carbon black is short, a chromogenic property and a coloring power may be poor. When the organic pigment or the carbon black is excessive, transparency and color tone may be poor.

The composite pigment obtained by coating the inorganic pigment particles with the organic pigment or the carbon black may be a commercially available product. Examples of the commercially available product include a silica/carbon black composite material, a silica/phthalocyanine PB 15:3 composite material, a silica/disazo yellow composite material, and a silica/quinacridone PR 122 composite material (all available from Todakogyo Corp.).

For example, when inorganic pigment particles having an average primary particle diameter of 20 nm are coated with an equal amount of an organic pigment, an average primary particle diameter of the resultant composite pigment becomes about 25 nm. When the resultant composite pigment can be dispersed to primary particles with an appropriate dispersant, it is possible to produce a very minute pigment-dispersed ink having an average primary particle diameter of 25 nm.

In production of the pigment-dispersed ink, what contributes to dispersion is not only the organic pigment on the surface but also the centered inorganic pigment, which exhibits own properties through a thin layer of the organic pigment having a thickness of 5 nm. Therefore, what matters is the selection of a pigment dispersant that can disperse and stabilize both of the organic pigment and the inorganic pigment simultaneously.

As another method for making the colorant water-dispersible, there is a method of subjecting a pigment to a surface treatment.

In terms of storage stability of the ink, the pigment is preferably a pigment oxidized with an oxidizing agent in order for an ionic group and an ionizable group to be incorporated into a surface of the pigment.

Preferable examples of the pigment subjected to such a surface treatment include pigments having ionicity. Preferable examples of the pigments having ionicity include anionically charged pigments.

The pigment is preferably a water-dispersible pigment containing, as an anionic functional group, at least one selected from the group consisting of —COOM, —$SO_3$M, —$PO_3$HM, —$PO_3M_2$, —$CONM_2$, —$SO_3NM_2$, NH—$C_6H_4$—COOM, —NH—$C_6H_4$—$SO_3$M, —NH—$C_6H_4$—$PO_3$HM, —NH—$C_6H_4$—$PO_3M_2$, —NH—$C_6H_4$—$CONM_2$, and —NH—$C_6H_4$—$SO_3NM_2$ and containing, as a counter ion M, a quaternary ammonium ion.

It is preferable that the pigment subjected to a surface treatment exhibit water dispersibility even in the absence of a dispersant. Such a pigment is commonly referred to as "self-dispersible pigment".

Preferable examples of the anionic functional group include carboxylic acid and P-aminobenzoic acid. It is possible to bind the anionic functional group with a surface of particles of the pigment according to methods described in, e.g., Japanese Patent No. 4697757, Japanese Translation of PCT International Application Publication No. JP-T-2003-513137, WO 97/48769, and Japanese Unexamined Patent Application Publication Nos. 10-110129, 11-246807, 11-57458, 11-189739, 11-323232, and 2000-265094.

Examples of the quaternary ammonium ion include tetramethylammonium ion, tetraethylammonium ion, tetrapropylammonium ion, tetrabutylammonium ion, tetrapentylammonium ion, benzyltrimethylammonium ion, benzyltriethylammonium ion, and tetrahexylammonium ion. One of these quaternary ammonium ions may be used alone or two or more of these quaternary ammonium ions may be used in combination. Among these quaternary ammonium ions, tetraethylammonium ion, tetrabutylammonium ion, and benzyltrimethylammonium ion are preferable, and tetrabutylammonium ion is more preferable.

The pigment can provide a water-dispersible pigment when the pigment contains the anionic functional group and the quaternary ammonium ion. The water-dispersible pigment can exhibit affinity in both of a water-rich ink and an organic solvent-rich ink from which a water content has evaporated and can stably maintain dispersibility.

A BET surface area of the pigment measured according to a method of making the pigment adsorb nitrogen varies in a broad range depending on a desired property of the pigment.

The BET specific surface area of the pigment is preferably 10 m²/g or greater but 1,500 m²/g or less, more preferably 20 m²/g or greater but 600 m²/g or less, and yet more preferably 50 m²/g or greater but 300 m²/g or less.

When a desired application is not easy with the BET surface area of the pigment, it is preferable to subject the pigment to a common treatment for size reduction or pulverization (e.g., ball mill pulverization, jet mill pulverization, or an ultrasonic treatment) in order to make the particle size of the pigment relatively small.

A volume average particle diameter ($D_{50}$) of the colorant is preferably 10 nm or greater but 200 nm or less in the ink. The volume average particle diameter of the colorant can be measured according to a dynamic light scattering method (e.g., with MICROTRAC UPA-150 available from Nikkiso Co., Ltd.) in an environment in which a temperature is 23° C. and a humidity is 55% RH.

A content of the colorant is not particularly limited and may be appropriately selected depending on the intended purpose, but is preferably 1% by mass or greater but 15% by mass or less and more preferably 2% by mass or greater but 10% by mass or less of the total amount of the ink. When the content of the colorant is 1% by mass or greater, glossiness and image density are favorable. When the content of the colorant is 15% by mass or less, ink dischargeability is favorable, a nozzle maintenance property is favorable, and there is also a cost advantage.

<Water>

The water may be pure water such as ion-exchanged water, ultrafiltrated water, reverse osmotic water, and distilled water, or ultrapure water.

A content of the water in the ink is not particularly limited and may be appropriately selected depending on the intended purpose.

<Other Components>

The other components are not particularly limited and may be appropriately selected depending on the intended purpose. Examples of the other components include a surfactant, a permeating agent, a pH adjuster, an antiseptic/fungicide, a chelating reagent, an anti-rust agent, an antioxidant, an ultraviolet absorber, an oxygen absorber, a light stabilizer, and a defoamer.

—Surfactant—

As the surfactant, preferable is a substance that does not spoil dispersion stability depending on the kind of the colorant and combination with the organic solvent and has a low surface tension, a high permeability, and a high leveling property.

As the surfactant, at least one selected from the group consisting of an anionic surfactant, a nonionic surfactant, a silicone surfactant, and a fluorosurfactant is preferable, and a fluorosurfactant and a silicone surfactant are more preferable.

Details of the fluorosurfactant are not particularly limited and may be appropriately selected depending on the intended purpose. For example, descriptions in paragraphs [0130] to [0152] of Japanese Unexamined Patent Application Publication No. 2015-044405 may be referred to.

Details of the silicone surfactant are not particularly limited and may be appropriately selected depending on the intended purpose. For example, descriptions in paragraphs [0153] to [0156] of Japanese Unexamined Patent Application Publication No. 2015-044405 may be referred to.

A content of the surfactant is preferably 0.01% by mass or greater but 3.0% by mass or less and more preferably 0.5% by mass or greater but 2% by mass or less of the total amount of the ink. When the content of the surfactant is 0.01% by mass or greater but 3.0% by mass or less, an image having an excellent glossiness and a high image density can be obtained.

—Permeating Agent—

The permeating agent is not particularly limited and may be appropriately selected depending on the intended purpose. Examples of the permeating agent include polyol compounds containing 8 through 11 carbon atoms and other polyol compounds. Among these polyol compounds, polyol compounds having a solubility in a range of from 0.2% by mass through 5.0% by mass in water of 25° C. are preferable, and 2-ethyl-1,3-hexanediol [solubility: 4.2% by mass (25° C.)] and 2,2,4-trimethyl-1,3-pentanediol [solubility: 2.0% by mass (25° C.)] are more preferable.

Examples of the other polyol compounds include 2-ethyl-2-methyl-1,3-propanediol, 3,3-dimethyl-1,2-butanediol, 2,2-diethyl-1,3-propanediol, 2-methyl-2-propyl-1,3-proanediol, 2,4-dimethyl-2,4-pentanediol, 2,5-dimethyl-2,5-hexanediol, and 5-hexene-1,2-diol. One of these polyol compounds may be used alone or two or more of these polyol compounds may be used in combination.

Other permeating agents that can be used in combination are not particularly limited and may be appropriately selected depending on the intended purpose so long as the permeating agents can dissolve in the ink and adjust the ink to a desired physical property. Examples of the other permeating agents include: alkylethers and arylethers of polyvalent alcohols such as diethylene glycol monophenylether, ethylene glycol monophenylether, ethylene glycol monoallylether, diethylene glycol monobutylether, propylene glycol monobutylether, and tetraethylene glycol chlorophenylether; and lower alcohols such as ethanol.

A content of the permeating agent is preferably 0.1% by mass or greater but 4.0% by mass or less of the total amount of the ink. When the content of the permeating agent is 0.1% by mass or greater but 4.0% by mass or less, image driability is improved, and an image having an excellent glossiness and a high image density can be obtained.

Physical properties of the ink of the present invention are not particularly limited and may be appropriately selected depending on the intended purpose. For example, it is preferable that a viscosity, a surface tension, and pH of the ink be in the ranges described below.

A viscosity of the ink at 25° C. is preferably 5 mPa·s or greater but 25 mPa·s or less. When the viscosity of the ink is 5 mPa·s or greater, an effect of improving image density and character quality can be obtained. When the viscosity of the ink is 25 mPa·s or less, a favorable ink dischargeability can be obtained.

The viscosity can be measured with a viscometer (e.g., RE-550L available from Told Sangyo Co., Ltd.) at 25° C.

A surface tension of the ink is preferably 35 mN/m or less and more preferably 32 mN/m or less at 25° C. When the surface tension of the ink is 35 mN/m or less, the ink can be leveled on a print medium adequately. This makes it possible to shorten a drying time.

pH of the ink is preferably in a range of from 7 through 12 and more preferably in a range of from 8 through 11 at 25° C.

<Method for Producing Ink>

The ink of the present invention can be produced by, for example, dispersing or dissolving the organic solvent and the colorant, and as needed, the surfactant, the permeating agent, and any other components in water, further adding the polyurethane resin particles, and stirring and mixing the materials.

The dispersing or dissolving can be performed with, for example, a sand mill, a homogenizer, a ball mill, a paint shaker, and an ultrasonic disperser. The stirring and mixing can be performed with, for example, a stirrer using a typical stirring blade, a magnetic stirrer, and a high-speed disperser.

A color to be imparted by the ink of the present invention is not particularly limited and may be appropriately selected depending on the intended purpose. Examples of the color include yellow, magenta, cyan, and black. When printing is performed using an ink set in which two or more of these colors are provided in combination, a multi-color image can be formed. When printing is performed using an ink set in which all of these colors are provided in combination, a full-color image can be formed.

(Ink Stored Container)

An ink stored container of the present invention includes the ink of the present invention and a container storing the ink, and may further include other members appropriately selected as needed.

The container is not particularly limited and may be of any shape, any structure, any size, any material, etc. that may be appropriately selected depending on the intended purpose. Examples of the container include a container including an ink bag formed of, for example, an aluminium laminate film or a resin film.

Figure 2:
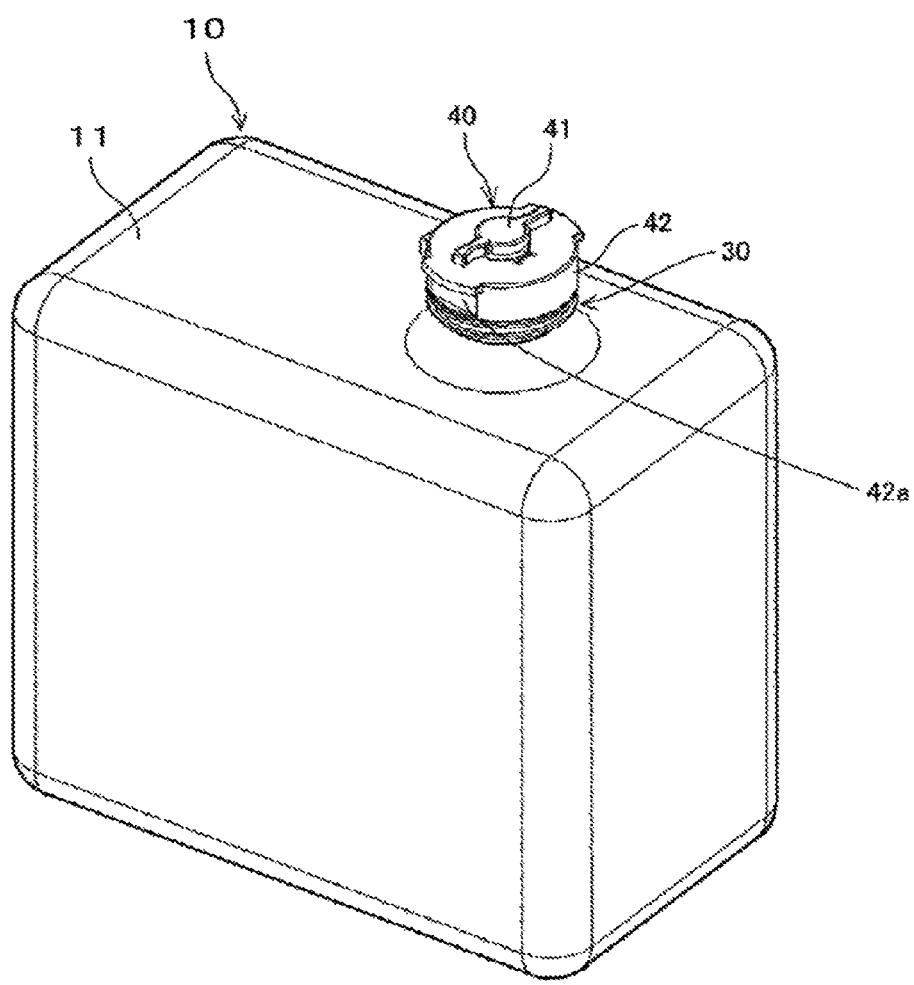
FIG. 2 is a depictive perspective external view illustrating an example of an ink stored container.
Figure 3:
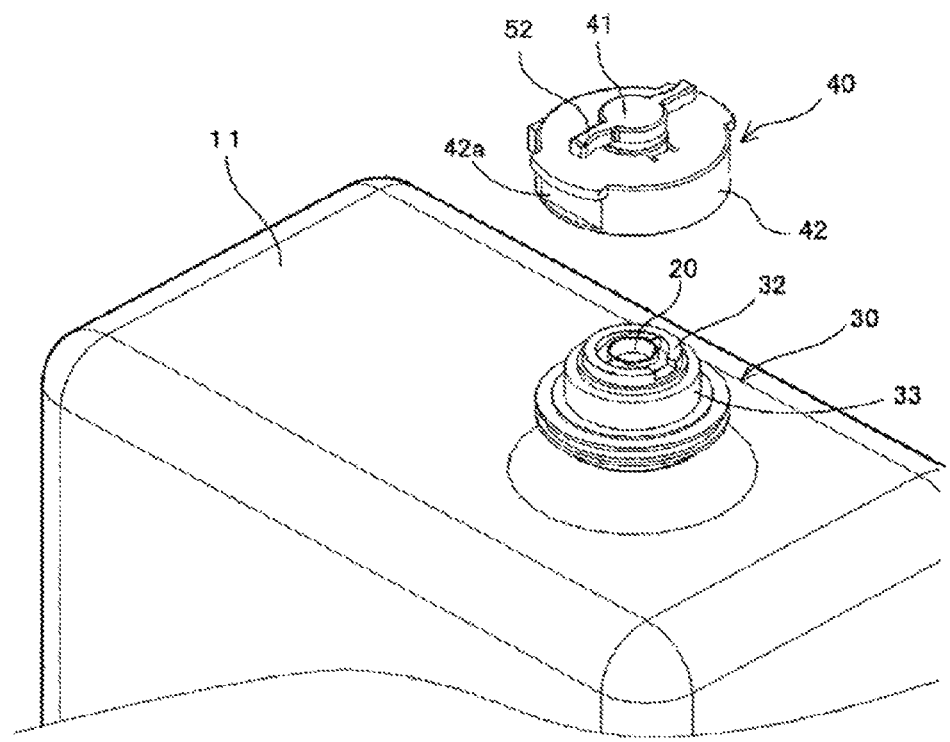
FIG. 3 is a depictive perspective view illustrating an example of an ink stored container before a cap member is attached on an ink supplying port portion.
Figure 4:
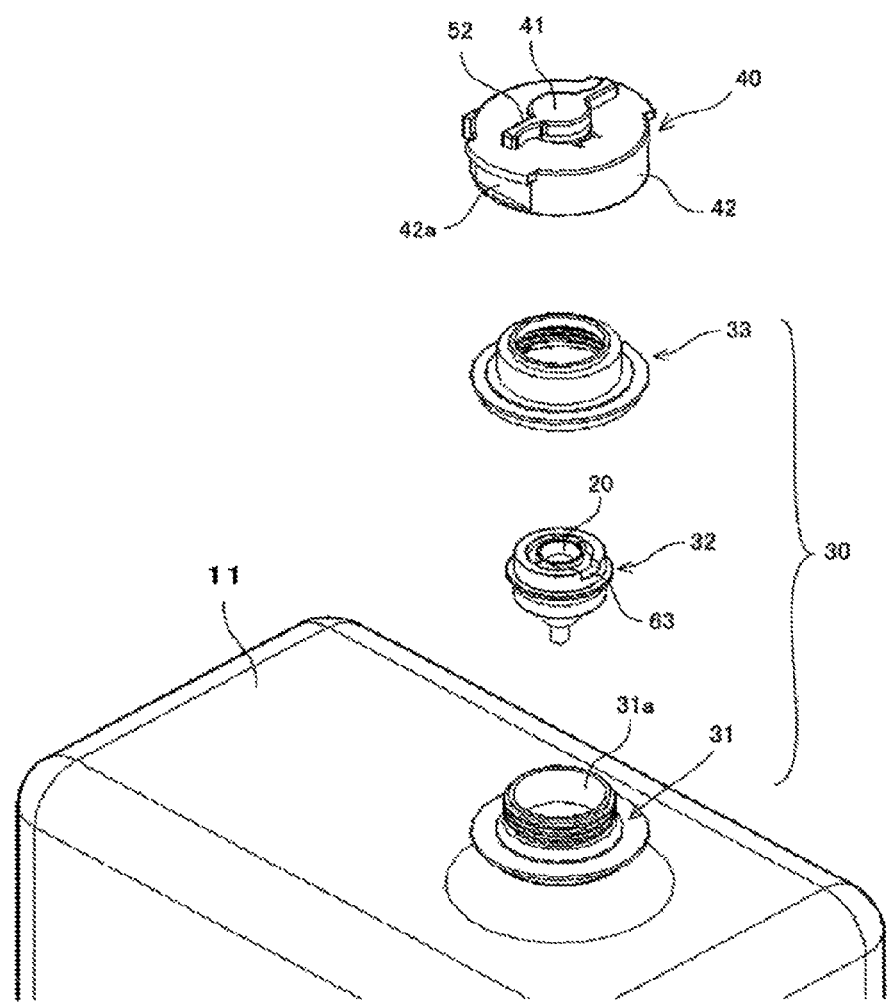
FIG. 4 is a depictive exploded perspective view illustrating an example of an ink supplying port portion.

The ink stored container of the present invention will be described below with reference to FIG. 2 to FIG. 4. FIG. 2 is a depictive perspective external view of the ink stored container. FIG. 3 is a depictive perspective view of the ink stored container before a cap member is attached on an ink supplying port portion. FIG. 4 is a depictive exploded perspective view of the ink supplying port portion.

An ink stored container 10 includes an ink storage 11 configured to store an ink inside. The ink storage 11 includes: an ink supplying port portion 30 including an ink supplying port 20 through which the ink is supplied to the outside; and a cap member 40 configured to cover the ink supplying port portion 30.

The ink supplying port portion 30 includes: a mouth member 31 secured to the ink storage 11; a rotation regulating member 32 disposed in an opening portion 31a of the mouth member 31 and including the ink supplying port 20; and a securing member 33 configured to secure the rotation regulating member 32 in the opening portion 31a of the mouth member 31 of the ink storage 11. The cap member 40 is configured to be attached on the securing member 33.

The ink supplying port 20 provided in the rotation regulating member 32 leads to an ink storing member housed in the ink storage 11 through, for example, a tube. The ink storing member is configured to store the ink. Here, the ink supplying port portion 30 is formed by assembling separate members, namely, the mouth member 31, the rotation regulating member 32, and the securing member 33. However, the mouth member 31, the rotation regulating member 32, and the securing member 33 may be formed integrally as a single part, or the ink storage 11 may also be additionally formed integrally.

(Inkjet Printing Method and Inkjet Printing Apparatus)

An inkjet printing apparatus of the present invention includes at least an ink discharging unit and further includes other units appropriately selected as needed.

An inkjet printing method of the present invention includes at least an ink discharging step and further includes other steps appropriately selected as needed.

The inkjet printing method of the present invention can be favorably performed by the inkjet printing apparatus of the present invention. The ink discharging step can be favorably performed by the ink discharging unit. The other steps can be favorably performed by the other units.

<Ink Discharging Step and Ink Discharging Unit>

The ink discharging step is a step of applying a stimulus to the inkjet ink of the present invention to discharge the ink and form an image on a base material, and can be performed by the ink discharging unit.

The ink discharging unit is not particularly limited and may be appropriately selected depending on the intended purpose. Examples of the ink discharging unit include an inkjet head.

Examples of the inkjet head include: a so-called piezo inkjet head (see Japanese Examined Patent Publication No. 02-51734) using a piezoelectric element as a pressure generating unit to pressurize an ink in an ink flow path to deform a vibration plate constituting a wall surface of the ink flow path and change the internal capacity of the ink flow path to discharge ink droplets; a so-called thermal inkjet head (see Japanese Examined Patent Publication No. 61-59911) using a heating resistor to heat an ink in an ink flow path and generate bubbles; and an electrostatic inkjet head (see Japanese Unexamined Patent Application Publication No. 06-71882) using a vibration plate constituting a wall surface of an ink flow path and an electrode disposed counter to the vibration plate to deform the vibration plate by the effect of an electrostatic force generated between the vibration plate and the electrode and change the internal capacity of the ink flow path to discharge ink droplets.

The stimulus can be generated by, for example, a stimulus generating unit. The stimulus is not particularly limited and may be appropriately selected depending on the intended purpose. Examples of the stimulus include heat (temperature), pressure, vibration, and light. One of these stimuli may be used alone or two or more of these stimuli may be used in combination. Among these stimuli, heat and pressure are preferable.

A method for discharging the ink is not particularly limited and is different depending on, for example, the kind of the stimulus. For example, when the stimulus is "heat", there is a method using, for example, a thermal head for applying a thermal energy corresponding to a printing signal to the ink in a printing head to generate bubbles in the ink by the thermal energy and discharge and jet the ink from nozzle holes of the printing head in a form of liquid droplets by a pressure of the bubbles. When the stimulus is "pressure", there is a method of, for example, applying a voltage to a piezoelectric element bonded to a position called a pressure chamber present in an ink flow path in a printing head to flex the piezoelectric element and shrink the capacity of the pressure chamber to discharge and jet the ink from nozzle holes of the printing head in a form of liquid droplets.

A size of the liquid droplets of the ink to be discharged is preferably 3 pl or greater but 40 pl or less. A discharging/jetting speed of the liquid droplets of the ink is preferably 5 m/s or higher but 20 m/s or lower. A driving frequency for discharging the liquid droplets of the ink is preferably 1 kHz or higher. A resolution of the liquid droplets of the ink is preferably 300 dpi or higher.

—Print Medium—

The print medium is not particularly limited and may be appropriately selected depending on the intended purpose. Examples of the print medium include plain paper, coated paper for printing, gloss paper, special paper, cloth, films, and OHP sheets. One of these print media may be used alone or two or more of these print media may be used in combination. Among these print media, coated paper for printing is preferable. Typically, the coated paper for printing is inferior to plain paper in ink absorbability. Therefore, in order to use the coated paper for printing for inkjet, it is common to use in combination with the coated paper for printing, a drying unit after printing. However, the coated paper for printing has been problematic in image driability. The ink of the present invention can satisfy image driability even when printed on the coated paper for printing.

The print medium may be a commercially available product. Examples of the commercially available product include: OK TOP COAT, OK ASTRO GLOSS, OK NON-WRINKLE, SA KANEFUJI+, OK KANEFUJI+, (F) MCOP, OK ASTRO DULL, OK ASTRO MATTE, OK ULTRA AQUA SATIN, OK EMBOSS KINUME, OK EMBOSS NASHIJI, OK EMBOSS NUNOME, OK EMBOSS HOMESPUN, OK OPTOGLOSS, OK KASAOU, OK CASA BLANCA, OK CASA BLANCA-V, OK CASA BLANCA-X, OK KANEFUJI SINGLE-SIDED, OK COAT L, OK COAT L GREEN 100, OK COAT N GREEN 100, OK COAT V, OK MEDIUM QUALITY COAT (for offset), OK TOP COAT S, OK TOP COAT DULL, OK TOP COAT MATTE N, OK TRINITY, OK TRINITY NAVI, OK TRINITY NAVI-V, OK NEO TOP COAT, OK NEO TOP COAT MATTE, OK NONWRINKLE AL, OK NONWRINKLE DL, OK NONWRINKLE BL, OK WHITE L, OK MATTE COAT L GREEN 100, OK MATTE COAT GREEN 100, OK ROYAL COAT, OK WHITE L, Z COAT, Z COAT GREEN 100, ULTRA SATIN KANEFUJI N, GOLDEN MATTE, SATIN KANEFUJI N, NEW AGE, NEW AGE GREEN 100, MIRROR COAT GOLD, MIRROR COAT PLATINUM, ROYAL COAT L, LOSTON COLOR, POD SUPERGLOSS, POD GLOSS COAT, and POD MATTE COAT (all available from Oji Paper Co., Ltd.); BROAD MATTE A, BROAD GLOSS A, WHITE PEARL COAT N, NEW V MATTE, PEARL COAT, DIGNITY, VISTA GLOSS, N PEARL COAT L, UTRILLO, EP-D GLOSS, EP-L GLOSS, EP-L MATTE, EP-D PREMIUM WHITE, and EP-SUPER PURE (all available from Mitsubishi Paper Mills Limited); HI-A, α-MATTE, KINMARI HI-L, MU COAT, MU MATTE, and MU WHITE (all available from Hokuetsu Kishu Paper Co., Ltd.); and LUMI ART GLOSS PAPER (available from Stora Enso Oyj). One of these print media may be used alone or two or more of these print media may be used in combination.

Among these print media, LUMI ART GLOSS PAPER is preferable. LUMI ART GLOSS PAPER has a low ink absorbability. Therefore, when a typical inkjet ink is used on LUMI ART GLOSS PAPER, a satisfactory image driability may not be obtained. However, with the ink of the present invention, a favorable driability can be obtained.

The print medium for use in printing is not particularly limited. Plain paper, gloss paper, special paper, cloth, etc. are usable. Also, good images can be formed on a non-permeating substrate.

The non-permeating substrate has a surface with low moisture permeability and absorbency and includes a material having myriad of hollow spaces inside but not open to the outside. To be more quantitative, the substrate has a water-absorption amount of 10 mL/m$^2$ or less between the contact and 30 msec$^{1/2}$ after the contact according to Bristow method.

For example, plastic films of polyvinyl chloride resin, polyethylene terephthalate (PET), polypropylene, polyethylene, and polycarbonate are suitably used for the non-permeating substrate.

The print medium is not limited to articles used as typical print media. It is suitable to use building materials such as wall paper, floor material, and tiles, cloth for apparel such as T-shirts, textile, and leather as the print medium. In addition, the configuration of the paths through which the print medium is transferred can be adjusted to accommodate ceramics, glass, metal, etc.

<Other Steps and Other Units>

Examples of the other steps include a heating step, a stimulus generating step, and a controlling step.

Examples of the other units include a heating unit, a stimulus generating unit, and a controlling unit.

The heating step is a step of heating a base material on which an image is printed, and can be performed by the heating unit.

Many known devices may be used as the heating unit. Examples of the heating unit include devices for forced-air heating, radiation heating, conduction heating, high-frequency drying, and microwave drying. One of these devices may be used alone or two or more of these devices may be used in combination.

A temperature for the heating may be varied depending on the kind and amount of a water-soluble solvent contained in the ink and a minimum filming temperature of a resin emulsion added, and may also be varied depending on the kind of the base material to be printed.

The temperature for the heating is preferably high, more preferably 40° C. or higher but 120° C. or lower, and yet more preferably 50° C. or higher but 90° C. or lower in terms of driability and a filming temperature. When the temperature for the heating is 40° C. or higher but 120° C. or lower, it is possible to suppress no discharging due to warming of an ink head.

Examples of the stimulus generating unit include heating devices, pressure devices, piezoelectric elements, vibration generating devices, ultrasonic oscillators, and lights. Specific examples of the stimulus generating unit include: piezoelectric actuators such as piezoelectric elements; thermal actuators using an electro-thermal converting element such as a heating resistor to utilize a phase change upon film boiling of a liquid; shape memory alloy actuators utilizing a phase change of a metal upon a temperature change; and electrostatic actuators utilizing an electrostatic force.

The controlling unit is not particularly limited and may be appropriately selected depending on the intended purpose so long as the controlling unit is capable of controlling operations of each unit. Examples of the controlling unit include devices such as a sequencer and a computer.

An example of the inkjet printing apparatus of the present invention will be described with reference to the drawings.

Figure 5:
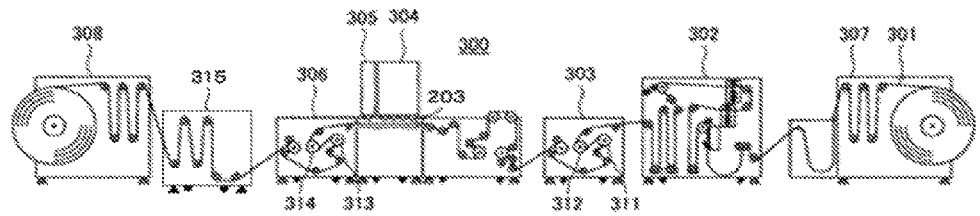
FIG. 5 is a schematic view illustrating an example of an inkjet printing apparatus according to an embodiment of the present invention.

FIG. 5 is a schematic view illustrating an example of the inkjet printing apparatus according to an embodiment of the present invention. The inkjet printing apparatus 300 of FIG. 5 includes a print medium conveying unit 301, a pretreatment step unit 302 configured to coat a print medium 203 with a pretreatment liquid, an image forming step unit 304, and a post-treatment step unit 305 configured to coat the print medium that has undergone an image forming step with a post-treatment liquid. In the present invention, the pretreatment step unit 302 and the post-treatment step unit 305 do not need to be provided.

The print medium conveying unit 301 includes a paper feeding device 307, a plurality of conveying rollers, and a winding device 308. The print medium 203 of FIG. 5 is a continuous sheet (roll sheet) wound in a roll shape. The print medium 203 is unwound from the paper feeding device by the conveying rollers, conveyed on a platen, and wound up by the winding device 308.

The print medium 203 conveyed from the print medium conveying unit 301 is coated with a pretreatment liquid in the pretreatment step unit 302 of FIG. 5. When an image is formed by an inkjet method on a print medium other than a dedicated inkjet sheet, there occur problems relating to qualities, such as feathering, density, color tone, and show-through, and problems relating to image robustness, such as water resistance and weather resistance. As a measure for solving these problems, a technique of coating a print medium with a pretreatment liquid having a function of aggregating an ink for improving image qualities is applied before an image is formed on the print medium.

The pretreatment step is not particularly limited so long as a coating method for coating a surface of a print sheet with the pretreatment liquid uniformly is used. Examples of the coating method include a blade coating method, a gravure coating method, a gravure offset coating method, a bar coating method, a roll coating method, a knife coating method, an air knife coating method, a comma coating method, a U-comma coating method, an AKKU coating method, a smoothing coating method, a microgravure coating method, a reverse roll coating method, a 4- or 5-roll coating method, a dip coating method, a curtain coating method, a slide coating method, and a die coating method.

Figure 6:
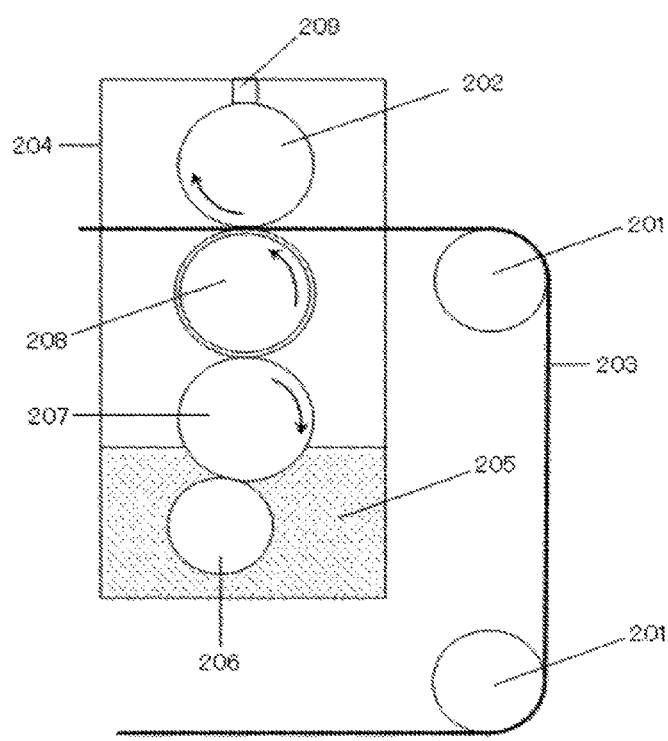
FIG. 6 is a schematic view illustrating an example of a pretreatment step unit of an inkjet printing apparatus according to an embodiment of the present invention.

FIG. 6 is a schematic view of the pretreatment step unit 302 according to the present embodiment. In the present embodiment, a roll coating method will be described. However, any other pretreatment liquid coating method may be used.

As illustrated in FIG. 6, a print medium 203 such as a continuous sheet is conveyed into a pretreatment liquid coating device 204 by a conveying roller 201. The pretreatment liquid coating device 204 stores a pretreatment liquid 205. The pretreatment liquid 205 is transferred onto a roller surface of a coating roller 208 into a form of a thin film by a stirring/supplying roller 206 and a transfer/thin-film-forming roller 207.

Then, the coating roller 208 rotates while being pressed onto a platen roller 202 that is rotating, and the print medium 203 is passed through between these rollers and coated with the pretreatment liquid 205 on the surface.

A pressure adjusting device 209 enables the platen roller 202 to adjust a nip pressure during coating of the pretreatment liquid. By changing the nip pressure, the platen roller 202 can change an amount of the pretreatment liquid 205 to be coated.

It is also possible to adjust the coating amount by changing rotation speeds of the coating roller 208 and the platen roller 202. The coating roller 208 and the platen roller 202 are driven by a power source such as a driving motor. It is possible to adjust the coating amount by changing energy of the power source to change the rotation speeds.

The method of coating a printing region of the print medium 203 with the pretreatment liquid 205 for improving image qualities using the coating roller 208 has an advantage over a treatment method of spraying a treating agent liquid on a print medium using a jet head in terms of capability of coating the print medium 203 more thinly with the pretreatment liquid 205 having a relatively high viscosity to make it possible to better suppress image feathering.

As illustrated in FIG. 5, the pretreatment step unit may include an after-pretreatment drying unit 303 after the coating step. The after-pretreatment drying unit includes, for example, heat rollers 311 and 312 as illustrated in FIG. 5. According to this device, the continuous sheet coated with the pretreatment liquid is conveyed by the conveying roller to the heat rollers. The heat rollers are heated to a high temperature in a range of from 50° C. through 100° C. By contact heat conduction from the heat rollers, a water content is evaporated from the continuous sheet coated with the pretreatment liquid, and the continuous sheet is dried. The drying unit is not limited to this example, but, for example, an infrared drying device, a microwave drying device, and a hot air device may also be used. The drying unit needs not be a single device, but may be, for example, a combination of a heat roller and a hot air device. Further, it is also effective to heat (pre-heat) the print medium before coating the print medium with the pretreatment liquid.

Figure 7:
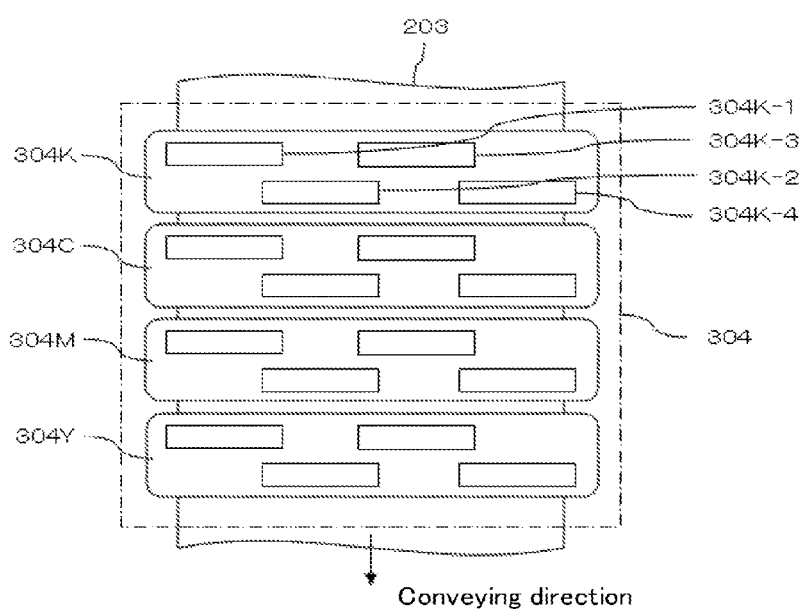
FIG. 7 is a schematic view illustrating an example of four head units of an inkjet printing apparatus according to an embodiment of the present invention.

In the image forming step unit, an image corresponding to image data is formed on the print medium that has undergone the pretreatment step. The image forming step unit 304 is a full-line head and includes four printing heads 304K, 304C, 304M, and 304Y that are arranged in this order from the upstream side of the conveying direction of the print medium and correspond to black (K), cyan (C), magenta (M), and yellow (Y). As illustrated in FIG. 7, a print region width of, for example, the printing head 304K for black (K) is secured by four short head units 304K-1, 304K-2, 304K-3, and 304K-4 that are arranged in a staggered formation in a direction perpendicular to the conveying direction.

Figure 8:
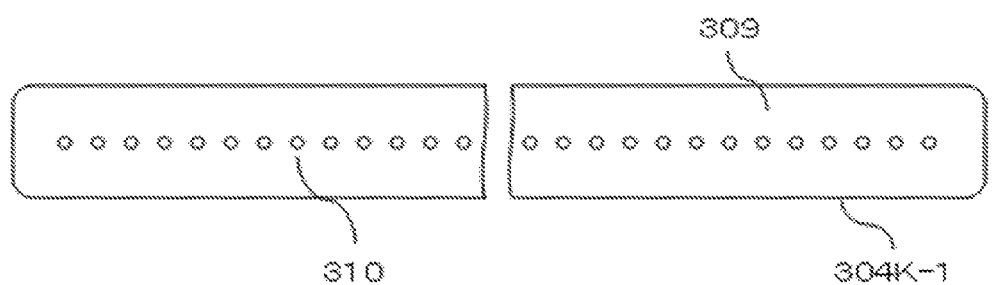
FIG. 8 is an enlarged view of one of the four head units of FIG. 7.

FIG. 8 is an enlarged view of the head unit 304K-1. As illustrated in FIG. 8, many print nozzles 310 are arranged on a nozzle surface 309 of the head unit 304K-1 along a longer direction of the head unit 304K-1 to constitute a nozzle line. In the present embodiment, there is one nozzle line. However, a plurality of nozzle lines may be provided. The other printing head 304C, 304M, and 304Y have the same configuration. The four printing heads 304K, 304C, 304M, and 304Y are arranged at the same pitch in the conveying direction. This configuration enables an image to be formed all over the print region width in one printing operation.

The kinds of the inks are not limited to K, C, M, and Y, but may be photo inks such as light cyan.

The print medium that has undergone the image forming step is coated with a post-treatment liquid in the post-treatment step unit 305. The post-treatment liquid contains a component that can form a transparent protective layer on the print medium.

In the post-treatment step of the present embodiment, the print medium may be coated with the post-treatment liquid entirely on the image surface or on a specific portion of the image surface. More preferably, it is desirable to vary the coating amount and the coating method depending on the printing conditions (e.g., the kind of the print medium and the amount of the ink discharged onto the sheet).

A method for coating the print medium with the post-treatment liquid is not particularly limited, and various methods are appropriately selected depending on the kind of the post-treatment liquid. However, it is preferable to use either a method similar to the method for coating the pretreatment liquid or a method similar to the above-described method for discharging the inkjet ink. Of these methods, a method similar to the method for discharging the inkjet k is particularly preferable in terms of apparatus configuration and storage stability of the post-treatment liquid. Use of this method enables the image to be coated with the post-treatment liquid at optional positions in amounts needed. This post-treatment step is a step of delivering the post-treatment liquid containing a transparent resin onto the surface of the formed image in a manner that the post-treatment liquid is attached in an amount in a range of from 0.5 g/m² through 10 g/m² when dried, to form a protective layer.

The amount of the post-treatment liquid attached when dried is preferably in a range of from 0.5 g/m² through 10 g/m² and more preferably in a range of from 2 g/m² through 8 g/m². When the amount of the post-treatment liquid attached when dried is 0.5 g/m² or greater, image qualities (image density, saturation, a gloss level, and fixability) are favorable. When the amount of the post-treatment liquid attached when dried is 10 g/m² or less, driability of the protective layer is favorable.

As illustrated in FIG. 5, the post-treatment step unit may include an after-post-treatment drying unit 306.

For example, the after-post-treatment drying unit includes heat rollers 313 and 314 as illustrated in FIG. 5. According to this device, the continuous sheet coated with the post-treatment liquid is conveyed by the conveying roller to the heat rollers. The heat rollers are heated to a high temperature. By contact heat conduction from the heat rollers, a water content is evaporated from the continuous sheet coated with the post-treatment liquid, and the continuous sheet is dried. The drying unit is not limited to this example, but, for example, an infrared drying device, a microwave drying device, and a hot air device may also be used. The drying unit needs not be a single device, but may be, for example, a combination of a heat roller and a hot air device.

The sheet after dried is wound up by the winding device 308. When pressing during this winding is strong, there is a possibility that the image may be transferred to the back surface. Lest this phenomenon occur, a pre-winding drying unit 315 as illustrated in FIG. 5 may be provided as needed. The configuration described above (e.g., a combination of a heat roller and a hot air device) may be used as the drying unit.

Here, an example of application to a line-type inkjet printing apparatus has been described. However, application to a serial-type (shuttle-type) inkjet printing apparatus is also possible.

(Printed Matter)

A printed matter of the present invention includes a print medium and an image formed on the print medium with the ink of the present invention.

The printed matter has high image qualities with no feathering, has an excellent glossiness, and can be favorably used for various purposes as, for example, a handout on which various printings or images are printed.

How to use the ink is not limited to the inkjet printing method. Specific examples of such methods other than the inkjet printing method include, but are not limited to, blade coating methods, gravure coating methods, bar coating methods, roll coating methods, dip coating methods, curtain coating methods, slide coating methods, die coating methods, and spray coating methods.

The applications of the ink of the present disclosure are not particularly limited. For example, the ink can be used for printed matter, a paint, a coating material, and foundation. The ink can be used to form two-dimensional texts and images and furthermore a three-dimensional solid object (3D modeling object) as a material for 3D modeling.

An apparatus for fabricating a three-dimensional object can be any known device with no particular limit. For example, the apparatus includes an ink container, a supplying device, and a discharging device, a drier, etc. The three-dimensional solid object includes an object manufactured by re-applying ink. In addition, the three-dimensional solid object can be manufactured by processing a structure having a substrate such as a print medium printed with the ink as a molded processed product. The molded processed product is fabricated by, for example, heating drawing or punching a structure or printed matter having a sheet-like form, film-like form, etc. The molded processed product is suitable for what is molded after surface-decorating. Examples thereof are gauges or operation panels of vehicles, office machines, electric and electronic machines, cameras, etc.

EXAMPLES

Examples of the present invention will be described below. However, the present invention should not be construed as being limited to the Examples.

Production Example 1-1 for Producing Resin Particles

Synthesis of Polyurethane Resin Particle Emulsion 1-1

Polycarbonate polyol (DURANOL T5650E available from Asahi Kasei Chemicals Corporation) (50 parts by mass) and 2,2-bis(hydroxymethyl)propionic acid (6.46 parts by mass) were added into a four-necked flask equipped with a nitrogen introducing tube, a cooling tube, a stirrer, and a thermocouple, mixed, and dried under heating to 40° C. and depressurization in the flask. Then, the flask was sufficiently purged with a nitrogen gas, dehydrated acetone (88 parts by mass), triethylamine (3.41 parts by mass), and hexamethylene diisocyanate (27.9 parts by mass) were added into the flask, and the materials in the flask were stirred, heated to 80° C., and allowed to undergo a reaction for 5 hours. Subsequently, the resultant was cooled to 40° C. Ion-exchanged water (163 parts by mass) and metaxylene diamine (2.09 parts by mass) were added into the flask, and the materials in the flask were stirred for 1 hour, to obtain a polyurethane resin particle emulsion.

A glass transition temperature (Tg) of the obtained polyurethane resin particles was measured in the manner described below, and was −10° C.

<Measurement of Glass Transition Temperature>

A glass transition temperature of the obtained polyurethane resin particles was obtained from an endothermic chart of a differential scanning calorimeter (DSC) (Q2000 available from TA Instruments Japan). Specifically, a water content and a solvent contained in the resin particles were evaporated. The dried, hardened resin particles were weighed out in an amount in a range of from 5 mg through 10 mg, loaded in a simple sealed pan formed of aluminium, and subjected to a measurement flow described below.

First heating: from 30° C. to 220° C. at 5° C./minute, and retention for 1 minute after reaching 220° C.

Cooling: quenching to −60° C. without temperature control, and retention for 1 minute after reaching −60° C.

Second heating: from −60° C. to 180° C. at 5° C./minute

A value according to a midpoint method was read from a thermogram of the second heating as the glass transition temperature (ASTM D3418/82 available from ASTM International).

Next, the polyurethane resin particle emulsion was subjected to a dispersion treatment in which the polyurethane resin particle emulsion was mixed and stirred in a 2,000 mL beaker formed of SUS304 stainless steel with an ultrasonic homogenizer (UP-400S available from Dr. Hielscher GmbH) at 30° C. at 400 W for 45 minutes. Subsequently, acetone was evaporated from the polyurethane resin particle emulsion under heating to 60° C. and depressurization, and the resultant was adjusted to a solid concentration of 50% by mass with ion-exchanged water. In this way, a polyurethane resin emulsion 1-1 was obtained.

A volume average particle diameter of the obtained polyurethane resin emulsion 1-1 was measured in the manner described below, and was 10 nm.

<Measurement of Volume Average Particle Diameter>

A volume average particle diameter of the obtained polyurethane resin emulsion 1-1 was measured with a particle size distribution measuring instrument (NANOTRAC UPA-EX150 available from Nikkiso Co., Ltd.).

Production Example 1-2 for Producing Resin Particles

Synthesis of Polyurethane Resin Particle Emulsion 1-2

A polyurethane resin emulsion 1-2 was obtained in the same manner as in Production example 1-1 for producing resin particles, except that conditions for stirring in the dispersion treatment in Production example 1-1 for producing resin particles were changed to 30° C., 400 W, for 30 minutes.

A volume average particle diameter of the obtained polyurethane resin emulsion 1-2 was measured in the same manner as in Production example 1-1 for producing resin particles, and was 15 nm.

Production Example 1-3 for Producing Resin Particles

Synthesis of Polyurethane Resin Particle Emulsion 1-3

A polyurethane resin emulsion 1-3 was obtained in the same manner as in Production example 1-1 for producing resin particles, except that conditions for stirring in the dispersion treatment in Production example 1-1 for producing resin particles were changed to 30° C., 400 W, for 18 minutes.

A volume average particle diameter of the obtained polyurethane resin emulsion 1-3 was measured in the same manner as in Production example 1-1 for producing resin particles, and was 19 nm.

Production Example 2 for Producing Resin Particles

Synthesis of Polyurethane Resin Particle Emulsion 2

Polycarbonate polyol (DURANOL T5651 available from Asahi Kasei Chemicals Corporation) (50 parts by mass) and 2,2-bis(hydroxymethyl)propionic acid (4.35 parts by mass) were added into a four-necked flask equipped with a nitrogen introducing tube, a cooling tube, a stirrer, and a thermocouple, mixed, and dried under heating to 40° C. and depressurization in the flask. Then, the flask was sufficiently purged with a nitrogen gas, dehydrated acetone (54 parts by mass), triethylamine (3.51 parts by mass), and tolylene diisocyanate (15.1 parts by mass) were added into the flask, and the materials in the flask were stirred, heated to 80° C., and allowed to undergo a reaction for 5 hours. Subsequently, the resultant was cooled to 40° C. Ion-exchanged water (135 parts by mass) and metaxylene diamine (0.42 parts by mass) were added into the flask, and the materials in the flask were stirred for 1 hour, to obtain a polyurethane resin particle emulsion.

A glass transition temperature (Tg) of the obtained polyurethane resin particle emulsion was measured in the same manner as in Production example 1-1 for producing resin particles, and was −30° C.

Next, the polyurethane resin particle emulsion was subjected to a dispersion treatment in which the polyurethane resin particle emulsion was mixed and stirred in a 2,000 mL beaker formed of SUS304 stainless steel with an ultrasonic homogenizer (UP-400S available from Dr. Hielscher GmbH) at 30° C. at 400 W for 30 minutes. Subsequently, acetone was evaporated from the polyurethane resin particle emulsion under heating to 60° C. and depressurization, and the resultant was adjusted to a solid concentration of 50% by mass with ion-exchanged water. In this way, a polyurethane resin emulsion 2 was obtained.

A volume average particle diameter of the obtained polyurethane resin emulsion 2 was measured in the same manner as in Production example 1-1 for producing resin particles, and was 15 nm.

Production Example 3-1 for Producing Resin Particles

Synthesis of Polyurethane Resin Particle Emulsion 3-1

Polyester polyol (TESLAC 2477 available from Hitachi Chemical Polymer Company) (50 parts by mass) and 2,2-bis(hydroxymethyl)propionic acid (1.77 parts by mass) were added into a four-necked flask equipped with a nitrogen introducing tube, a cooling tube, a stirrer, and a thermocouple, mixed, and dried under heating to 40° C. and depressurization in the flask. Then, the flask was sufficiently purged with a nitrogen gas, dehydrated acetone (62 parts by mass), triethylamine (0.94 parts by mass), and norbornene methane diisocyanate (9.1 parts by mass) were added into the flask, and the materials in the flask were stirred, heated to 80° C., and allowed to undergo a reaction for 5 hours. Subsequently, the resultant was cooled to 40° C. Ion-exchanged water (115 parts by mass) and isophoronediamine (1.69 parts by mass) were added into the flask, and the materials in the flask were stirred for 1 hour, to obtain a polyurethane resin particle emulsion.

A glass transition temperature (Tg) of the obtained polyurethane resin particle emulsion was measured in the same manner as in Production example 1-1 for producing resin particles, and was 10° C.

Next, the polyurethane resin particle emulsion was subjected to a dispersion treatment in which the polyurethane resin particle emulsion was mixed and stirred in a 2,000 mL beaker formed of SUS304 stainless steel with an ultrasonic homogenizer (UP-400S available from Dr. Hielscher GmbH) at 30° C. at 400 W for 1 hour. Subsequently, acetone was evaporated from the polyurethane resin particle emulsion under heating to 60° C. and depressurization, and the resultant was adjusted to a solid concentration of 50% by mass with ion-exchanged water. In this way, a polyurethane resin emulsion 3-1 was obtained.

A volume average particle diameter of the obtained polyurethane resin emulsion 3-1 was measured in the same manner as in Production example 1-1 for producing resin particles, and was 8 nm.

Production Example 3-2 for Producing Resin Particles

Synthesis of Polyurethane Resin Particle Emulsion 3-2

A polyurethane resin emulsion 3-2 was obtained in the same manner as in Production example 3-1 for producing resin particles, except that conditions for stirring in the dispersion treatment in Production example 3-1 for producing resin particles were changed to 30° C., 400 W, for 30 minutes.

A volume average particle diameter of the obtained polyurethane resin emulsion 3-2 was measured in the same manner as in Production example 1-1 for producing resin particles, and was 15 nm.

Production Example 4 for Producing Resin Particles

Synthesis of Polyurethane Resin Particle Emulsion 4

Polycarbonte polyol (a reaction product of 1,6-hexanediol and dimethyl carbonate) (50 parts by mass) and 2,2-bis(hydroxymethyl)propionic acid (4.58 parts by mass) were added into a four-necked flask equipped with a nitrogen introducing tube, a cooling tube, a stirrer, and a thermocouple, mixed, and dried under heating to 40° C. and depressurization in the flask. Then, the flask was sufficiently purged with a nitrogen gas, dehydrated acetone (63 parts by mass), triethylamine (3.70 parts by mass), and hexamethylene diisocyanate (26.6 parts by mass) were added into the flask, and the materials in the flask were stirred, heated to 80° C., and allowed to undergo a reaction for 5 hours. Subsequently, the resultant was cooled to 40° C. Ion-exchanged water (158 parts by mass) and dipropylene triamine (0.48 parts by mass) were added into the flask, and the materials in the flask were stirred for 1 hour, to obtain a polyurethane resin particle emulsion.

A glass transition temperature (Tg) of the obtained polyurethane resin particle emulsion was measured in the same manner as in Production example 1-1 for producing resin particles, and was 12° C.

Next, the polyurethane resin particle emulsion was subjected to a dispersion treatment in which the polyurethane resin particle emulsion was mixed and stirred in a 2,000 mL beaker formed of SUS304 stainless steel with an ultrasonic homogenizer (UP-400S available from Dr. Hielscher GmbH) at 30° C. at 400 W for 45 minutes. Subsequently, acetone was evaporated from the polyurethane resin particle emulsion under heating to 60° C. and depressurization, and the resultant was adjusted to a solid concentration of 50% by mass with ion-exchanged water. In this way, a polyurethane resin emulsion 4 was obtained.

A volume average particle diameter of the obtained polyurethane resin emulsion 4 was measured in the same manner as in Production example 1-1 for producing resin particles, and was 10 nm.

Production Example 5 for Producing Resin Particles

Synthesis of Polyurethane Resin Particle Emulsion 5

Polyester polyol (KURAPOLE P-2010 available from Kuraray Co., Ltd.) (50 parts by mass) and 2,2-bis(hydroxymethyl)propionic acid (1.55 parts by mass) were added into a four-necked flask equipped with a nitrogen introducing tube, a cooling tube, a stirrer, and a thermocouple, mixed, and dried under heating to 40° C. and depressurization in the flask. Then, the flask was sufficiently purged with a nitrogen gas, dehydrated acetone (46 parts by mass), triethylamine (0.99 parts by mass), and isophorone diisocyanate (9.3 parts by mass) were added into the flask, and the materials in the flask were stirred, heated to 80° C., and allowed to undergo a reaction for 5 hours. Subsequently, the resultant was cooled to 40° C. Ion-exchanged water (115 parts by mass) and isophoronediamine (0.62 parts by mass) were added into the flask, and the materials in the flask were stirred for 1 hour, to obtain a polyurethane resin particle emulsion.

A glass transition temperature (Tg) of the obtained polyurethane resin particle emulsion was measured in the same manner as in Production example 1-1 for producing resin particles, and was −32° C.

Next, the polyurethane resin particle emulsion was subjected to a dispersion treatment in which the polyurethane resin particle emulsion was mixed and stirred in a 2,000 mL beaker formed of SUS304 stainless steel with an ultrasonic homogenizer (UP-400S available from Dr. Hielscher GmbH) at 30° C. at 400 W for 45 minutes. Subsequently, acetone was evaporated from the polyurethane resin particle emulsion under heating to 60° C. and depressurization, and the resultant was adjusted to a solid concentration of 50% by mass with ion-exchanged water. In this way, a polyurethane resin emulsion 5 was obtained.

A volume average particle diameter of the obtained polyurethane resin emulsion 5 was measured in the same manner as in Production example 1-1 for producing resin particles, and was 10 nm.

Production Example 6-1 for Producing Resin Particles

Synthesis of Polyurethane Resin Particle Emulsion 6-1

Polycarbonate polyol (DURANOLE T5651 available from Asahi Kasei Chemicals Corporation) (50 parts by mass) and 2,2-bis(hydroxymethyl)propionic acid (3.07 parts by mass) were added into a four-necked flask equipped with a nitrogen introducing tube, a cooling tube, a stirrer, and a thermocouple, mixed, and dried under heating to 40° C. and depressurization in the flask. Then, the flask was sufficiently purged with a nitrogen gas, dehydrated acetone (50 parts by mass), triethylamine (1.62 parts by mass), and tolylene diisocyanate (13.1 parts by mass) were added into the flask, and the materials in the flask were stirred, heated to 80° C., and allowed to undergo a reaction for 5 hours. Subsequently, the resultant was cooled to 40° C. Ion-exchanged water (126 parts by mass) and dipropylene triamine (0.29 parts by mass) were added into the flask, and the materials in the flask were stirred for 1 hour, to obtain a polyurethane resin particle emulsion.

A glass transition temperature (Tg) of the obtained polyurethane resin particle emulsion was measured in the same manner as in Production example 1-1 for producing resin particles, and was −20° C.

Next, the polyurethane resin particle emulsion was subjected to a dispersion treatment in which the polyurethane resin particle emulsion was mixed and stirred in a 2,000 mL beaker formed of SUS304 stainless steel with an ultrasonic homogenizer (UP-400S available from Dr. Hielscher GmbH) at 30° C. at 400 W for 1 hour. Subsequently, acetone was evaporated from the polyurethane resin particle emulsion under heating to 60° C. and depressurization, and the resultant was adjusted to a solid concentration of 50% by mass with ion-exchanged water. In this way, a polyurethane resin emulsion 6-1 was obtained.

A volume average particle diameter of the obtained polyurethane resin emulsion 6-1 was measured in the same manner as in Production example 1-1 for producing resin particles, and was 8 nm.

Production Example 6-2 for Producing Resin Particles

Synthesis of Polyurethane Resin Particle Emulsion 6-2

A polyurethane resin emulsion 6-2 was obtained in the same manner as in Production example 6-1 for producing resin particles, except that conditions for stirring in the dispersion treatment in Production example 6-1 for producing resin particles were changed to 30° C., 400 W, for 10 minutes.

A volume average particle diameter of the obtained polyurethane resin emulsion 6-2 was measured in the same manner as in Production example 1-1 for producing resin particles, and was 22 mm.

Production Example 7 for Producing Resin Particles

Synthesis of Polyurethane Resin Particle Emulsion 7

Polyester polyol (TESLAC 2477 available from Hitachi Chemical Polymer Company) (50 parts by mass) and 2,2-bis(hydroxymethyl)propionic acid (1.26 parts by mass) were added into a four-necked flask equipped with a nitrogen introducing tube, a cooling tube, a stirrer, and a thermocouple, mixed, and dried under heating to 40° C. and depressurization in the flask. Then, the flask was sufficiently purged with a nitrogen gas, dehydrated acetone (45 parts by mass), triethylamine (0.80 parts by mass), and norbornene methane diisocyanate (8.3 parts by mass) were added into the flask, and the materials in the flask were stirred, heated to 80° C., and allowed to undergo a reaction for 5 hours. Subsequently, the resultant was cooled to 40° C. Ion-exchanged water (112 parts by mass) and diethylenetriamine (0.21 parts by mass) were added into the flask, and the materials in the flask were stirred for 1 hour, to obtain a polyurethane resin particle emulsion.

A glass transition temperature (Tg) of the obtained polyurethane resin particle emulsion was measured in the same manner as in Production example 1-1 for producing resin particles, and was 0° C.

Next, the polyurethane resin particle emulsion was subjected to a dispersion treatment in which the polyurethane resin particle emulsion was mixed and stirred in a 2,000 mL beaker formed of SUS304 stainless steel with an ultrasonic homogenizer (UP-400S available from Dr. Hielscher GmbH) at 30° C. at 400 W for 5 hours. Subsequently, acetone was evaporated from the polyurethane resin particle emulsion under heating to 60° C. and depressurization, and the resultant was adjusted to a solid concentration of 50% by mass with ion-exchanged water. In this way, a polyurethane resin emulsion 7 was obtained.

A volume average particle diameter of the obtained polyurethane resin emulsion 7 was measured in the same manner as in Production example 1-1 for producing resin particles, and was 6 nm.

TABLE 1

| Resin emulsion | Resin particles | Homogenizer operating time | Volume average particle diameter (nm) |
|---|---|---|---|
| Polyurethane resin emulsion 1-1 | Polyurethane resin particles 1 | 45 minutes | 10 |
| Polyurethane resin emulsion 1-2 | Polyurethane resin particles 1 | 30 minutes | 15 |
| Polyurethane resin emulsion 1-3 | Polyurethane resin particles 1 | 18 minutes | 19 |
| Polyurethane resin emulsion 2 | Polyurethane resin particles 2 | 30 minutes | 15 |
| Polyurethane resin emulsion 3-1 | Polyurethane resin particles 3 | 1 hour | 8 |
| Polyurethane resin emulsion 3-2 | Polyurethane resin particles 3 | 30 minutes | 15 |
| Polyurethane resin emulsion 4 | Polyurethane resin particles 4 | 45 minutes | 10 |
| Polyurethane resin emulsion 5 | Polyurethane resin particles 5 | 45 minutes | 10 |
| Polyurethane resin emulsion 6-1 | Polyurethane resin particles 6 | 1 hour | 8 |
| Polyurethane resin emulsion 6-2 | Polyurethane resin particles 6 | 10 minutes | 22 |
| Polyurethane resin emulsion 7 | Polyurethane resin particles 7 | 5 hours | 6 |

Preparation Example 1 for Preparing Pigment Dispersion

Preparation of Surface-Reformed Black Pigment Dispersion

A dispersion liquid of SENSIJET BLACK SDP2000 (carbon black available from Sensient Technologies Corporation, with a pigment solid concentration of 14.5% by mass) (1 kg) was subjected to acid deposition with a 0.1 N HCl aqueous solution. Then, the resultant was adjusted to pH of 9 with a 10% by mass tetrabutylammonium hydroxide solution (methanol solution). Thirty minutes later, a surface-reformed black pigment emulsion was obtained.

The obtained surface-reformed black pigment dispersion contained the pigment that was bound with at least one carboxylic acid group, sulfonic group, carboxylic acid tetrabutylammonium salt, or sulfonic acid tetrabutylammonium salt.

The surface-reformed black pigment dispersion and ion-exchanged highly-pure water were subjected to ultrafiltration through a dialysis membrane and then subjected to ultrasonic dispersion, to be concentrated to a pigment solid concentration of 25% by mass.

A volume average particle diameter ($D_{50}$) of the obtained surface-reformed black pigment dispersion was measured with a particle size distribution measuring instrument (NANOTRAC UPA-EX150 available from Nikkiso Co., Ltd.), and was 120 nm.

Preparation Example 2 for Preparing Pigment Dispersion

Preparation of Surface-Reformed Magenta Pigment Dispersion

A dispersion liquid of SMART MAGENTA 3122BA (Pigment Red 122 surface-treated emulsion available from Sensient Technologies Corporation, with a pigment solid concentration of 14.5% by mass) (1 kg) was subjected to acid deposition with a 0.1 N HCl aqueous solution. Then, the resultant was adjusted to pH of 9 with a 10% by mass tetraethylammonium hydroxide aqueous solution. Thirty minutes later, a surface-reformed magenta pigment dispersion was obtained.

The obtained surface-reformed magenta pigment dispersion contained the pigment that was bound with at least one amino benzoic acid group or amino benzoic acid tetraethylammonium salt.

The surface-reformed magenta pigment dispersion and ion-exchanged highly-pure water were subjected to ultrafiltration through a dialysis membrane and then subjected to ultrasonic dispersion, to be concentrated to a pigment solid concentration of 25% by mass.

A volume average particle diameter ($D_{50}$) of the obtained surface-reformed magenta pigment dispersion was measured in the same manner as in Preparation example 1 for preparing pigment dispersion, and was 104 nm.

Preparation Example 3 for Preparing Pigment Dispersion

Preparation of Surface-Reformed Cyan Pigment Dispersion

A dispersion liquid of SMART CYAN 3154BA (Pigment Blue 15:4 surface-treated emulsion available from Sensient Technologies Corporation, with a pigment solid concentration of 14.5% by mass) (1 kg) was subjected to acid deposition with a 0.1 N HCl aqueous solution. Then, the resultant was adjusted to pH of 9 with a 40% by mass benzyltrimethylammonium hydroxide solution (methanol solution). Thirty minutes later, a surface-reformed cyan pigment emulsion was obtained.

The obtained surface-reformed cyan pigment emulsion contained the pigment that was bound with at least one amino benzoic acid group or amino benzoic acid benzyltrimethylammonium salt. The surface-reformed cyan pigment emulsion and ion-exchanged highly-pure water were subjected to ultrafiltration through a dialysis membrane and then subjected to ultrasonic dispersion, to be concentrated to a pigment solid concentration of 25% by mass.

A volume average particle diameter ($D_{50}$) of the obtained surface-reformed cyan pigment emulsion was measured in the same manner as in Preparation example 1 for preparing pigment dispersion, and was 116 nm.

Preparation Example 4 for Preparing Pigment Dispersion

Preparation of Surface-Reformed Yellow Pigment Dispersion

A dispersion liquid of SMART YELLOW 3074BA (Pigment Yellow 74 surface-treated emulsion available from Sensient Technologies Corporation, with a pigment solid concentration of 14.5% by mass) (1 kg) was subjected to acid deposition with a 0.1 N HCl aqueous solution. Then, the resultant was adjusted to pH of 9 with a 10% by mass tetrabutylammonium hydroxide solution (methanol solution). Thirty minutes later, a surface-reformed yellow pigment dispersion was obtained.

The obtained surface-reformed yellow pigment dispersion contained the pigment that was bound with at least one amino benzoic acid group or amino benzoic acid tetrabutylammonium salt.

The obtained surface-reformed yellow pigment dispersion and ion-exchanged highly-pure water were subjected to ultrafiltration through a dialysis membrane and then subjected to ultrasonic dispersion, to be concentrated to a pigment solid concentration of 25% by mass.

A volume average particle diameter ($D_{50}$) of the obtained surface-reformed cyan pigment dispersion was measured in the same manner as in Preparation example 1 for preparing pigment dispersion, and was 145 nm.

Examples 1 to 18 and Comparative Examples 1 to 7

Based on the composition and contents presented in Table 2 to Table 5 below, an organic solvent, a permeating agent, a surfactant, a fungicide, a defoamer, a pH adjustor, and water were mixed and stirred for 1 hour to a uniform mixture. A pigment dispersion was added to this mixture liquid, and the resultant was stirred for 1 hour. Next, a resin emulsion was added to the resultant, and the resultant was stirred for another 1 hour, to obtain an ink. The obtained ink was subjected to pressure filtration through a polyvinylidene fluoride membrane filter having an average pore diameter of 0.8 μm, to remove coarse particles and dusts. In this way, inks of Examples 1 to 18 and Comparative Examples 1 to 7 were produced.

TABLE 2

|  |  | Examples | | | | | | | |
|---|---|---|---|---|---|---|---|---|---|
|  |  | 1 | 2 | 3 | 4 | 5 | 6 | 7 | 8 |
| Pigment dispersion | Surface-reformed black pigment dispersion | — | — | — | 20.0 | — | — | — | — |
|  | Surface-reformed cyan pigment dispersion | 12.0 | — | — | — | 12.0 | 12.0 | 12.0 | 12.0 |
|  | Surface-reformed magenta pigment dispersion | — | 20.0 | — | — | — | — | — | — |
|  | Surface-reformed yellow pigment dispersion | — | — | 12.0 | — | — | — | — | — |

TABLE 2-continued

|  |  | Examples | | | | | | | |
|---|---|---|---|---|---|---|---|---|---|
|  |  | 1 | 2 | 3 | 4 | 5 | 6 | 7 | 8 |
| Resin emulsion | Polyurethane resin emulsion 1-1 | 18.0 | — | — | — | 30.0 | — | — | — |
|  | Polyurethane resin emulsion 1-2 | — | — | — | 10.0 | — | — | — | — |
|  | Polyurethane resin emulsion 1-3 | — | 40.0 | — | — | — | — | — | — |
|  | Polyurethane resin emulsion 2 | — | — | 18.0 | — | — | — | — | — |
|  | Polyurethane resin emulsion 3-1 | — | — | — | — | — | 18.0 | — | — |
|  | Polyurethane resin emulsion 3-2 | — | — | — | — | — | — | — | — |
|  | Polyurethane resin emulsion 4 | — | — | — | — | — | — | 24.0 | — |
|  | Polyurethane resin emulsion 5 | — | — | — | — | — | — | — | 4.8 |
|  | Polyurethane resin emulsion 6-1 | — | — | — | — | — | — | — | — |
|  | Polyurethane resin emulsion 6-2 | — | — | — | — | — | — | — | — |
|  | Polyurethane resin emulsion 7 | — | — | — | — | — | — | — | — |
|  | AQUABRID UX-100 | — | — | — | — | — | — | — | — |
|  | EMULSION ELIETEL KZT-8904 | — | — | — | — | — | — | — | — |
| Organic solvent | Solvent A Propylene glycol monopropylether (105 mmHg/100° C.) | — | 20.0 | — | 10.0 | — | 15.0 | 25.0 | — |
|  | Propylene glycol monomethylether (380 mmHg/100° C.) | 15.0 | — | 20.0 | — | 15.0 | — | — | 20.0 |
|  | 3-methoxybutanol (92 mmHg/100° C.) | — | — | — | — | — | — | — | — |
|  | Ethylene glycol monobutylether (68 mmHg/100° C.) | — | — | — | — | — | — | — | — |
|  | 1-butanol (413 mmHg/100° C.) | — | — | — | — | — | — | — | — |
|  | 3-methyl-3-methoxybutanol (61 mmHg/100° C.) | — | — | — | — | — | — | — | — |
|  | 3-methyl-1,3-butanediol (15.1 mmHg/100° C.) | — | — | — | — | — | — | — | — |
|  | Solvent B 3-ethyl-3-hydroxymethyloxetane (13.5 mmHg/100° C.) | 28.0 | — | 25.0 | — | 32.0 | 32.0 | — | 26.0 |
|  | 1,3-butanediol (11.8 mmHg/100° C.) | — | 17.0 | — | 35.0 | — | — | 19.0 | — |
| Permeating agent | 2-ethyl-1,3-hexanediol | 1.0 | 1.0 | — | — | 1.0 | 1.0 | 1.0 | 1.0 |
|  | 2,2,4-trimethyl-1,3-pentanediol | — | — | 1.0 | 1.0 | — | — | — | — |
| Surfactant | ZONYL FS-300 | — | — | 2.5 | 2.5 | — | — | — | — |
|  | SOFTANOL EP-7025 | 1.0 | 1.0 | — | — | — | — | 1.0 | 1.0 |
|  | UNIDYNE DSN-403N | — | — | — | — | 0.5 | 0.5 | — | — |
| Fungicide | PROXEL GXL | 0.05 | 0.05 | 0.05 | 0.05 | 0.05 | 0.05 | 0.05 | 0.05 |
| Defoamer | Silicone defoamer KM-72F | 0.1 | 0.1 | 0.1 | 0.1 | 0.1 | 0.1 | 0.1 | 0.1 |
| pH adjustor | 2-amino-2-ethyl-1,3-propanediol | 0.3 | 0.3 | 0.3 | 0.1 | 0.3 | 0.3 | 0.3 | 0.3 |
| Pure water |  | Balance | Balance | Balance | Balance | Balance | Balance | Balance | Balance |
| Total (% by mass) |  | 100 | 100 | 100 | 100 | 100 | 100 | 100 | 100 |

TABLE 3

|  |  | Examples | | | | | | | |
|---|---|---|---|---|---|---|---|---|---|
|  |  | 9 | 10 | 11 | 12 | 13 | 14 | 15 | 16 |
| Pigment dispersion | Surface-reformed black pigment dispersion | — | — | — | — | — | — | — | — |
|  | Surface-reformed cyan pigment dispersion | 12.0 | 12.0 | 12.0 | 12.0 | 12.0 | 12.0 | 12.0 | 12.0 |
|  | Surface-reformed magenta pigment dispersion | — | — | — | — | — | — | — | — |
|  | Surface-reformed yellow pigment dispersion | — | — | — | — | — | — | — | — |
| Resin emulsion | Polyurethane resin emulsion 1-1 | — | — | — | — | 18.0 | 18.0 | 18.0 | 18.0 |
|  | Polyurethane resin emulsion 1-2 | — | — | — | 36.0 | — | — | — | — |
|  | Polyurethane resin emulsion 1-3 | — | — | — | — | — | — | — | — |
|  | Polyurethane resin emulsion 2 | — | — | — | — | — | — | — | — |
|  | Polyurethane resin emulsion 3-1 | — | — | — | — | — | — | — | — |
|  | Polyurethane resin emulsion 3-2 | — | — | — | — | — | — | — | — |
|  | Polyurethane resin emulsion 4 | — | — | — | — | — | — | — | — |
|  | Polyurethane resin emulsion 5 | — | — | — | — | — | — | — | — |
|  | Polyurethane resin emulsion 6-1 | — | 24.0 | — | — | — | — | — | — |
|  | Polyurethane resin emulsion 6-2 | 30.0 | — | — | — | — | — | — | — |
|  | Polyurethane resin emulsion 7 | — | — | 18.0 | — | — | — | — | — |
|  | AQUABRID UX-100 | — | — | — | — | — | — | — | — |
|  | EMULSION ELIETEL KZT-8904 | — | — | — | — | — | — | — | — |
| Organic solvent | Solvent A Propylene glycol monopropylether (105 mmHg/100° C.) | 20.0 | — | 15.0 | — | 8.0 | 27.0 | — | — |
|  | Propylene glycol monomethylether (380 mmHg/100° C.) | — | 15.0 | — | 15.0 | — | — | — | — |
|  | 3-methoxybutanol (92 mmHg/100° C.) | — | — | — | — | — | — | 15.0 | — |
|  | Ethylene glycol monobutylether (68 mmHg/100° C.) | — | — | — | — | — | — | — | 15.0 |

TABLE 3-continued

|  |  | Examples | | | | | | | |
|---|---|---|---|---|---|---|---|---|---|
|  |  | 9 | 10 | 11 | 12 | 13 | 14 | 15 | 16 |
|  | 1-butanol (413 mmHg/100° C.) | — | — | — | — | — | — | — | — |
|  | 3-methyl-3-methoxybutanol (61 mmHg/100° C.) | — | — | — | — | — | — | — | — |
|  | 3-methyl-1,3-butanediol (15.1 mmHg/100° C.) | — | — | — | — | — | — | — | — |
| Solvent B | 3-ethyl-3-hydroxylmethyloxetane (13.5 mmHg/100° C.) | 20.0 | 35.0 | — | — | 40.0 | 20.0 | 27.0 | 27.0 |
|  | 1,3-butanediol (11.8 mmHg/100° C.) | — | — | 33.0 | 27.0 | — | — | — | — |
| Permeating agent | 2-ethyl-1,3-hexanediol | — | — | — | — | 1.0 | 1.0 | 1.0 | 1.0 |
|  | 2,2,4-trimethyl-1,3-pentanediol | 1.0 | 1.0 | 1.0 | 1.0 | — | — | — | — |
| Surfactant | ZONYL FS-300 | 2.5 | 2.5 | — | — | — | — | 2.5 | 2.5 |
|  | SOFTANOL EP-7025 | — | — | — | — | 1.0 | 1.0 | — | — |
|  | UNIDYNE DSN-403N | — | — | 0.5 | 0.5 | — | — | — | — |
| Fungicide | PROXEL GXL | 0.05 | 0.05 | 0.05 | 0.05 | 0.05 | 0.05 | 0.05 | 0.05 |
| Defoamer | Silicone defoamer KM-72F | 0.1 | 0.1 | 0.1 | 0.1 | 0.1 | 0.1 | 0.1 | 0.1 |
| pH adjustor | 2-amino-2-ethyl-1,3-propanediol | 0.1 | 0.3 | 0.3 | 0.3 | 0.3 | 0.3 | 0.1 | 0.3 |
| Pure water |  | Balance | Balance | Balance | Balance | Balance | Balance | Balance | Balance |
| Total (% by mass) |  | 100 | 100 | 100 | 100 | 100 | 100 | 100 | 100 |

TABLE 4

|  |  | Examples | |
|---|---|---|---|
|  |  | 17 | 18 |
| Pigment dispersion | Surface-reformed black pigment dispersion | — | — |
|  | Surface-reformed cyan pigment dispersion | 12.0 | 12.0 |
|  | Surface-reformed magenta pigment dispersion | — | — |
|  | Surface-reformed yellow pigment dispersion | — | — |
| Resin emulsion | Polyurethane resin emulsion 1-1 | — | — |
|  | Polyurethane resin emulsion 1-2 | 27.6 | 15.0 |
|  | Polyurethane resin emulsion 1-3 | — | — |
|  | Polyurethane resin emulsion 2 | — | — |
|  | Polyurethane resin emulsion 3-1 | — | — |
|  | Polyurethane resin emulsion 3-2 | — | — |
|  | Polyurethane resin emulsion 4 | — | — |
|  | Polyurethane resin emulsion 5 | — | — |
|  | Polyurethane resin emulsion 6-1 | — | — |
|  | Polyurethane resin emulsion 6-2 | — | — |
|  | Polyurethane resin emulsion 7 | — | — |
|  | AQUABRID UK-100 | — | — |
|  | EMULSION ELIETEL KZT-8904 | — | — |
| Organic solvent | Solvent A Propylene glycol monopropylether (105 mmHg/100° C.) | 12.0 | 24.0 |
|  | Propylene glycol monomethylether (380 mmHg/100° C.) | — | — |
|  | 3-methoxybutanol (92 mmHg/100° C.) | — | — |
|  | Ethylene glycol monobutylether (68 mmHg/100° C.) | — | — |
|  | 1-butanol (413 mmHg/100° C.) | — | — |
|  | 3-methyl-3-methoxybutanol (61 mmHg/100° C.) | — | — |
|  | 3-methyl-1,3-butanediol (15.1 mmHg/100° C.) | — | — |
|  | Solvent B 3-ethyl-3-hydroxylmethyloxetane (13.5 mmHg/100° C.) | 35.0 | 23.0 |
|  | 1,3-butanediol (11.8 mmHg/100° C.) | — | — |
| Permeating agent | 2-ethyl-1,3-hexanediol | 1.0 | 1.0 |
|  | 2,2,4-trimethyl-1,3-pentanediol | — | — |
| Surfactant | ZONYL FS-300 | 2.5 | 2.5 |
|  | SOFTANOL EP-7025 | — | — |
|  | UNIDYNE DSN-403N | — | — |
| Fungicide | PROXEL GXL | 0.05 | 0.05 |
| Defoamer | Silicone defoamer KM-72F | 0.1 | 0.1 |
| pH adjustor | 2-amino-2-ethyl-1,3-propanediol | 0.3 | 0.3 |
|  | Pure water | Balance | Balance |
|  | Total (% by mass) | 100 | 100 |

TABLE 5

|  |  | Comparative Examples | | | | | | |
| --- | --- | --- | --- | --- | --- | --- | --- | --- |
|  |  | 1 | 2 | 3 | 4 | 5 | 6 | 7 |
| Pigment dispersion | Surface-reformed black pigment dispersion | — | — | — | 20.0 | — | — | — |
|  | Surface-reformed cyan pigment dispersion | 12.0 | — | — | — | 12.0 | 12.0 | 12.0 |
|  | Surface-reformed magenta pigment dispersion | — | 20.0 | — | — | — | — | — |
|  | Surface-reformed yellow pigment dispersion | — | — | 12.0 | — | — | — | — |
| Resin emulsion | Polyurethane resin emulsion 1-1 | — | — | — | — | — | — | 18.0 |
|  | Polyurethane resin emulsion 1-2 | — | — | — | — | 48.0 | 18.0 | — |
|  | Polyurethane resin emulsion 1-3 | — | — | — | — | — | — | — |
|  | Polyurethane resin emulsion 2 | — | — | — | — | — | — | — |
|  | Polyurethane resin emulsion 3-1 | — | — | — | — | — | — | — |
|  | Polyurethane resin emulsion 3-2 | 12.0 | — | — | — | — | — | — |
|  | Polyuretliane resin emulsion 4 | — | — | — | — | — | — | — |
|  | Polyurethane resin emulsion 5 | — | — | — | 30.0 | — | — | — |
|  | Polyurethane resin emulsion 6-1 | — | — | — | — | — | — | — |
|  | Polyurethane resin emulsion 6-2 | — | — | — | — | — | — | — |
|  | Polyurethane resin emulsion 7 | — | — | — | — | — | — | — |
|  | AQUABRID UX-100 | — | 30.0 | — | — | — | — | — |
|  | EMULSION ELIETEL KZT-8904 | — | — | 30.0 | — | — | — | — |
| Organic solvent | Solvent A | Propylene glycol monopropylether (105 mmHg/100° C.) | 15.0 | 20.0 | — | — | — | — | — |
|  |  | Propylene glycol monomethylether (380 mmHg/100° C.) | — | — | 15.0 | — | — | — | — |
|  |  | 3-methoxybutanol (92 mmHg/100° C.) | — | — | — | — | — | — | — |
|  |  | Ethylene glycol monobutylether (68 mmHg/100° C.) | — | — | — | — | — | — | — |
|  |  | 1-butanol (413 mmHg/100° C.) | — | — | — | — | — | 15.0 | — |
|  |  | 3-methyl-3-methoxybutanol (61 mmHg/100° C.) | — | — | — | 15.0 | — | — | — |
|  |  | 3-methyl-1,3-butanediol (15.1 mmHg/100° C.) | — | — | — | — | 15.0 | — | — |
|  | Solvent B | 3-ethyl-3-hydroxylmethyloxetane (13.5 mmHg/100° C.) | 27.0 | — | 35.0 | — | 23.0 | 30.0 | 45.0 |
|  |  | 1,3-butanediol (11.8 mmHg/100° C.) | — | 27.0 | — | 25.0 | — | — | — |
| Permeating agent |  | 2-ethyl-1,3-hexanediol | 1.0 | 1.0 | — | — | 1.0 | 1.0 | 1.0 |
|  |  | 2,2,4-trimethyl-1,3-pentanediol | — | — | 1.0 | 1.0 | — | — | — |
| Surfactant |  | ZONYL FS-300 | — | — | 2.5 | 2.5 | — | — | — |
|  |  | SOFTANOL EP-7025 | 1.0 | 1.0 | — | — | — | — | — |
|  |  | UNIDYNE DSN-403N | — | — | — | — | 0.5 | 0.5 | 0.5 |
| Fungicide |  | PROXEL GXL | 0.05 | 0.05 | 0.05 | 0.05 | 0.05 | 0.05 | 0.05 |
| Defoamer |  | Silicone defoamer KM-72F | 0.1 | 0.1 | 0.1 | 0.1 | 0.1 | 0.1 | 0.1 |
| pH adjustor |  | 2-amino-2-ethyl-1,3-propanediol | 0.05 | 0.3 | 0.3 | 0.3 | 0.3 | 0.3 | 0.3 |
| Pure water |  |  | Balance | Balance | Balance | Balance | Balance | Balance | Balance |
| Total (% by mass) |  |  | 100 | 100 | 100 | 100 | 100 | 100 | 100 |

Details of the components described in Table 2 to Table 5 are as follows.

AQUABRID UX-100: an acrylic-based emulsion (available from Daicel FineChem Ltd., with a glass transition temperature (Tg) of −10° C. and a solid concentration of 50% by mass). A product obtained by subjecting the acrylic-based emulsion to a dispersion treatment using an ultrasonic homogenizer to be adjusted to a volume average particle diameter of 10 nm was used.

EMULSION ELIETEL KZT-8904: a polyester-based emulsion (available from Unitika Ltd., with a glass transition temperature (Tg) of 8° C. and a solid concentration of 30% by mass). A product obtained by subjecting the polyester-based emulsion to a dispersion treatment using an ultrasonic homogenizer to be adjusted to a volume average particle diameter of 10 nm was used.

ZONYL FS-300: polyoxyethylene perfluoroalkylether (available from Du Pont Kabushiki Kaisha, with a component concentration of 40% by mass)

SOFTANOL EP-7025: polyoxyalkylene alkylether (available from Nippon Shokubai Co., Ltd., with a component concentration of 100% by mass)

UNIDYNE DSN-403N: a perfluoroalkyl-polyoxyethylene oxide adduct (available from Daikin Industries, Ltd., with a component concentration of 100% by mass)

PROXEL GXL: a fungicide mainly formed of 1,2-benzisothiazolin-3-one (available from Avecia Corporation Limited, with a component concentration of 20% by mass, containing dipropylene glycol)

KM-72F: a self-emulsifiable silicone defoamer (available from Shin-Etsu Silicone Co., Ltd., with a component concentration of 100% by mass)

Next, details of the organic solvent used in Examples and Comparative Examples are presented in Table 6 below collectively.

TABLE 6

| | Ink color | Organic solvent A Compound in solvent A | Organic solvent A Vapor pressure (mmHg) at 100° C. | Organic solvent A Content: C (% by mass) | Ratio by mass (C/A) | Organic solvent B Compound in solvent B | Organic solvent B Vapor pressure (mmHg) at 100° C. | Organic solvent B Content (% by mass) |
|---|---|---|---|---|---|---|---|---|
| Ex. 1 | C | PNM | 380 | 15 | 1.67 | EHO | 13.5 | 28 |
| Ex. 2 | M | PNP | 105 | 20 | 1.00 | 1,3-BD | 11.8 | 17 |
| Ex. 3 | Y | PNM | 380 | 20 | 2.22 | EHO | 13.5 | 25 |
| Ex. 4 | K | PNP | 105 | 10 | 2.00 | 1,3-BD | 11.8 | 35 |
| Ex. 5 | C | PNM | 380 | 15 | 1.00 | EHO | 13.5 | 32 |
| Ex. 6 | C | PNP | 105 | 15 | 1.67 | EHO | 13.5 | 32 |
| Ex. 7 | C | PNP | 105 | 25 | 2.08 | 1,3-BD | 11.8 | 19 |
| Ex. 8 | C | PNM | 380 | 20 | 8.33 | EHO | 13.5 | 26 |
| Ex. 9 | C | PNP | 105 | 20 | 1.33 | EHO | 13.5 | 20 |
| Ex. 10 | C | PNM | 380 | 15 | 1.25 | EHO | 13.5 | 35 |
| Ex. 11 | C | PNP | 105 | 15 | 1.67 | 1,3-BD | 11.8 | 33 |
| Ex. 12 | C | PNM | 380 | 15 | 0.83 | 1,3-BD | 11.8 | 27 |
| Ex. 13 | C | PNP | 105 | 8 | 0.89 | EHO | 13.5 | 40 |
| Ex. 14 | C | PNP | 105 | 27 | 3.00 | EHO | 13.5 | 20 |
| Ex. 15 | C | 3-MB | 92 | 15 | 1.67 | EHO | 13.5 | 27 |
| Ex. 16 | C | ENB | 68 | 15 | 1.67 | EHO | 13.5 | 27 |
| Ex. 17 | C | PNP | 105 | 12 | 0.87 | EHO | 13.5 | 35 |
| Ex. 18 | C | PNP | 105 | 24 | 3.20 | EHO | 13.5 | 23 |
| Comp. Ex. 1 | C | PNP | 105 | 15 | 2.50 | EHO | 13.5 | 27 |
| Comp. Ex. 2 | M | PNP | 105 | 20 | 1.33 | 1,3-BD | 11.8 | 27 |
| Comp. Ex. 3 | Y | PNM | 380 | 15 | 1.67 | EHO | 13.5 | 35 |
| Comp. Ex. 4 | K | MMB | 61 | 15 | 1.00 | 1,3-BD | 11.8 | 25 |
| Comp. Ex. 5 | C | MBD | 15.1 | 15 | 0.63 | EHO | 13.5 | 23 |
| Comp. Ex. 6 | C | 1-butanol | 413 | 15 | 1.67 | EHO | 13.5 | 30 |
| Comp. Ex. 7 | C | None | None | None | None | EHO | 13.5 | 45 |

*The ratio by mass (C/A) is a ratio by mass of a content C (% by mass) of a compound having a saturated vapor pressure at 100° C. of 65 mmHg or greater but 400 mmHg or less to a content A (% by mass) of polyurethane resin particles.

Abbreviations and details of the organic solvents in Table 6 are as follows.
PNP: propylene glycol monopropylether (saturated vapor pressure at 100° C.: 105 mmHg)
PNM: propylene glycol monomethylether (saturated vapor pressure at 100° C.: 380 mmHg)
3-MB: 3-methoxybutanol (saturated vapor pressure at 100° C.: 92 mmHg)
ENB: ethylene glycol monobutylether (saturated vapor pressure at 100° C.: 68 mmHg)
MMB: 3-methyl-3-methoxybutanol (saturated vapor pressure at 100° C.: 61 mmHg)
MBD: 3-methyl-1,3-butanediol (saturated vapor pressure at 100° C.: 15.1 mmHg)
EHO: 3-ethyl-3-hydroxymethyloxetane (saturated vapor pressure at 100° C.: 13.5 mmHg)
1,3-BD: 1,3-buanediol (saturated vapor pressure at 100° C.: 11.8 mmHg)
1-butanol (saturated vapor pressure at 100° C.: 413 mmHg)

Next, details of the resin particles used in Examples and Comparative Examples are presented in Table 7 below collectively.

TABLE 7

| | Resin particles Kind | Volume average particle diameter (nm) | Content A (% by mass) | Glass transition temperature Tg (° C.) | Homogenizer operating time | Ratio by mass (A/B) |
|---|---|---|---|---|---|---|
| Ex. 1 | Polyurethane resin particles 1-1 | 10 | 9.0 | −10 | 45 minutes | 3.0 |
| Ex. 2 | Polyurethane resin particles 1-3 | 19 | 20.0 | −10 | 18 minutes | 4.0 |
| Ex. 3 | Polyurethane resin particles 2 | 15 | 9.0 | −30 | 30 minutes | 3.0 |
| Ex. 4 | Polyurethane resin particles 1-2 | 15 | 5.0 | −10 | 30 minutes | 1.0 |
| Ex. 5 | Polyurethane resin particles 1-1 | 10 | 15.0 | −10 | 45 minutes | 5.0 |
| Ex. 6 | Polyurethane resin particles 3-1 | 8 | 9.0 | 10 | 1 hour | 3.0 |
| Ex. 7 | Polyurethane resin particles 4 | 10 | 12.0 | 12 | 45 minutes | 4.0 |
| Ex. 8 | Polyurethane resin particles 5 | 10 | 2.4 | −32 | 45 minutes | 0.8 |

TABLE 7-continued

| | | Resin particles | | | | |
|---|---|---|---|---|---|---|
| | Kind | Volume average particle diameter (nm) | Content A (% by mass) | Glass transition temperature Tg (° C.) | Homogenizer operating time | Ratio by mass (A/B) |
| Ex. 9 | Polyurethane resin particles 6-2 | 22 | 15.0 | −20 | 10 minutes | 5.0 |
| Ex. 10 | Polyurethane resin particles 6-1 | 8 | 12.0 | −20 | 1 hour | 4.0 |
| Ex. 11 | Polyurethane resin particles 7 | 6 | 9.0 | 0 | 5 hours | 3.0 |
| Ex. 12 | Polyurethane resin particles 1-2 | 15 | 18.0 | −10 | 30 minutes | 6.0 |
| Ex. 13 | Polyurethane resin particles 1-1 | 10 | 9.0 | −10 | 45 minutes | 3.0 |
| Ex. 14 | Polyurethane resin particles 1-1 | 10 | 9.0 | −10 | 45 minutes | 3.0 |
| Ex. 15 | Polyurethane resin particles 1-1 | 10 | 9.0 | −10 | 45 minutes | 3.0 |
| Ex. 16 | Polyurethane resin particles 1-1 | 10 | 9.0 | −10 | 45 minutes | 3.0 |
| Ex. 17 | Polyurethane resin particles 1-2 | 15 | 13.8 | −10 | 30 minutes | 4.6 |
| Ex. 18 | Polyurethane resin particles 1-2 | 15 | 7.5 | −10 | 30 minutes | 2.5 |
| Comp. Ex. 1 | Polyurethane resin particles 3-2 | 15 | 6.0 | 10 | 30 minutes | 2.0 |
| Comp. Ex. 2 | Acrylic resin particles | 10 | 15.0 | −10 | — | 3.0 |
| Comp. Ex. 3 | Polyester resin particles | 10 | 9.0 | 8 | — | 3.0 |
| Comp. Ex. 4 | Polyurethane resin particles 5 | 10 | 15.0 | −32 | 45 minutes | 3.0 |
| Comp. Ex. 5 | Polyurethane resin particles 1-2 | 15 | 24.0 | −10 | 30 minutes | 8.0 |
| Comp. Ex. 6 | Polyurethane resin particles 1-2 | 15 | 9.0 | −10 | 30 minutes | 3.0 |
| Comp. Ex. 7 | Polyurethane resin particles 1-1 | 10 | 9.0 | −10 | 45 minutes | 3.0 |

*The ratio by mass (A/B) is a ratio by mass of a content A (% by mass) of resin particles to a content B (% by mass) of a colorant.

Next, various properties of the produced inks were evaluated in the manners described below. The results are presented in Table 8.

<Measurement of Sensor Output at Critical Image Peeling Point Measured by Microscratching Testing Method>

An inkjet printer (IPSIO GX5500 available from Ricoh Company Ltd.) was loaded with each of the produced inks. Next, a solid image was formed on coat paper (LUMI ART GLOSS 130GSM PAPER available from Stora Enso Oyj) under conditions that a resolution would be 1,200 dpi and the ink would be attached in an amount of 0.96 mg/cm². The solid image was dried in a thermostat bath set to an internal temperature of 100° C. for 30 seconds.

With a microscratching tester (CSR-2000 available from Rhesca Corporation), a sensor output at a critical image peeling point, measured by a microscratching method, of the solid image was obtained under the conditions described below (according to JIS R3255-1997 "A method for testing attachability of a thin film on a glass substrate"). The measurement was performed once, and the position measured was the center of the solid image.

—Measurement Conditions—

Scratching speed: 20 μm/s
Measurement time 30 seconds
Load when the measurement ended: 10 mN
Amplitude level: 100 μm
Exciting frequency: 45 Hz
Data sampling: 3,735 Hz
Spring constant: 100 g/mm
Stylus (diamond needle) diameter: 5 μm <Measurement of Arithmetic Mean Roughness Ra of Image>

An inkjet printer (IPSIO GX5500 available from Ricoh Company Ltd.) was loaded with each of the produced inks. Next, a solid image was formed on coat paper (LUMI ART GLOSS 130GSM PAPER available from Stora Enso Oyj) under conditions that a resolution would be 1,200 dpi and the ink would be attached in an amount of 0.96 mg/cm². Subsequently, the solid image was dried in a thermostat bath set to an internal temperature of 100° C. for 30 seconds. Next, an arithmetic roughness of the solid image was measured with a laser microscope (VK-850 available from Keyence Corporation) under a condition that a measuring pitch was 0.1 μm. A vertically 0.4 mm-depth region of the solid image was scanned 10 times, and an average of the measurements was calculated as an arithmetic mean roughness Ra.

<Scratch Resistance>

An inkjet printer (IPSIO GX5500 available from Ricoh Company Ltd.) was loaded with each of the produced inks. Next, coat paper (LUMI ART GLOSS 130GSM PAPER available from Stora Enso Oyj) was set. Next, a solid image was formed at a resolution of 1,200 dpi. Subsequently, the solid image was dried in a thermostat bath set to an internal temperature of 100° C. for 30 seconds. After the drying, the solid image was scratched 20 times with a white portion of the coat paper cut into a size of 1.2 cm on four sides, and any stains on the white portion of the coat paper due to ink adhesion were measured with a reflective color spectroscopic colorimetric densitometer (available from X-Rite Inc.). A transfer density was obtained by subtracting the background color of the scratching coat paper, to evaluate scratch resistance according to the criteria described below. An evaluation of higher than or equal to C is tolerable.

[Evaluation Criteria]

A: The transfer density was lower than 0.13.
B: The transfer density was higher than or equal to 0.13 but lower than 0.17.
C: The transfer density was higher than or equal to 0.17 but lower than 0.20.
D: The transfer density was 0.20 or higher.

<Image Density>

An inkjet printer (IPSIO GX5500 available from Ricoh Company Ltd.) was loaded with each of the produced inks. Next, coat paper (LUMI ART GLOSS 130GSM PAPER available from Stora Enso Oyj) was set. A chart that was generated with MICROSOFT WORD 2000 (available from Microsoft Corporation) and in which a 64-point character "square" (a character represented by a solidly painted square) was described was printed at a resolution of 1,200 dpi, and the printed portion was dried in a thermostat bath set to an internal temperature of 100° C. for 30 seconds. An image density of the dried printed matter was measured with a reflective color spectroscopic colorimetric densitometer (available from X-Rite Inc.) and evaluated according to the criteria described below. An evaluation of higher than or equal to C is tolerable.

[Evaluation Criteria]
- A: Black: 1.6 or higher
  - Yellow: 1.1 or higher
  - Magenta: 1.4 or higher
  - Cyan: 1.6 or higher
- B: Black: 1.3 or higher but lower than 1.6
  - Yellow: 1.0 or higher but lower than 1.1
  - Magenta: 1.1 or higher but lower than 1.4
  - Cyan: 1.3 or higher but lower than 1.6
- C: Black: 1.1 or higher but lower than 1.3
  - Yellow: 0.8 or higher but lower than 1.0
  - Magenta: 0.9 or higher but lower than 1.1
  - Cyan: 1.1 or higher but lower than 1.3
- D: Black: Lower than 1.1
  - Yellow: Lower than 0.8
  - Magenta: Lower than 0.9
  - Cyan: Lower than 1.1

<Glossiness>

An inkjet printer (IPSIO GX5500 available from Ricoh Company Ltd.) was loaded with each of the produced inks. Next, a solid image was formed on a gloss print medium (RICOH BUSINESS COAT GLOSS 100, with a background gloss level of 21 at 60°, available from Ricoh Company Ltd.) at a resolution of 1,200 dpi. Subsequently, the solid image was dried in a thermostat bath set to an internal temperature of 100° C. for 30 seconds.

Next, a 60° gloss level of the solid image was measured with a gloss meter (MICRO-GLOSS 60° available from Atlas Material Testing Technology, LLC), and glossiness was evaluated according to the criteria described below. An evaluation of higher than or equal to C is tolerable.

[Evaluation Criteria]
- A: The 60° gloss level was 30% or higher.
- B: The 60° gloss level was 25% or higher but lower than 30%
- C: The 60° gloss level was 20% or higher but lower than 25%.
- D: The 60° gloss level was lower than 20%.

<Blocking Property>

An inkjet printer (IPSIO GX5500 available from Ricoh Company Ltd.) was loaded with each of the produced inks. Next, coat paper (LUMI ART GLOSS 130GSM PAPER available from Stora Enso Oyj) was set, and a solid image was formed at a resolution of 1,200 dpi. Subsequently, the solid image was dried in a thermostat bath set to an internal temperature of 100° C. for 30 seconds. Immediately after the drying, the solid image was cut out, stuck to a white portion of the coat paper, and left to stand under a weight of 5 kgf/cm² placed from above in an environment in which a temperature was 23° C. and a humidity was 50% RH for 24 fours. Twenty four hours later, a degree of transfer of the solid image (pigment) to the white portion of the coat paper was visually observed, and a blocking property was evaluated according to the criteria described below. An evaluation of higher than or equal to C is tolerable.

[Evaluation Criteria]
- A: There was no transfer to the white portion.
- B: A part of the image was transferred to the white portion and the transfer could be recognized from a distance of 30 cm.
- C: A part of the image was transferred to the white portion and the transfer could be recognized from a distance of 60 cm.
- D: A most part of the image was transferred to the white portion.

<Maintenance Property>

An inkjet printer (IPSIO GX5500 available from Ricoh Company Ltd.) was loaded with each of the produced inks. Next, the printer was left to stand still in a decapped state in a thermostat bath of 40° C. for 24 hours and then taken out. Head refreshing was performed from a printer driver, and a number of times of the head refreshing needed until all nozzles succeeded in discharging the ink was obtained. A maintenance property was evaluated according to the criteria described below. An evaluation of higher than or equal to C is tolerable.

[Evaluation Criteria]
- A: All nozzles succeeded in discharging the ink with less than 4 times of head refreshing.
- B: All nozzles succeeded in discharging the ink with 4 or more but less than 7 times of head refreshing.
- C: All nozzles succeeded in discharging the ink with 7 or more but less than 10 times of head refreshing.
- D: All nozzles succeeded in discharging the ink with 10 or more times of head refreshing.

<Storage Stability of Ink>

Forty grams of each of the produced inks was poured into a plastic container having a capacity of 50 mL and stored in a thermostat bath of 70° C. for 14 days. A change rate of a viscosity of the ink after storage to a viscosity of the ink before storage was calculated according to the mathematical formula described below and evaluated according to the criteria described below.

The viscosity of the ink was measured with a viscometer (RE80L available from Told Sangyo Co., Ltd.) at 25° C. An evaluation of higher than or equal to C is tolerable.

[Evaluation Criteria]
- A: The viscosity change rate was lower than 5%.
- B: The viscosity change rate was 5% or higher but lower than 7%.
- C: The viscosity change rate was 7% or higher but lower than 10%.
- D: The viscosity change rate was 10% or higher.

$$\text{Viscosity change rate (\%)} = \frac{\text{ink viscosity after storage} - \text{ink viscosity before storage}}{\text{ink viscosity before storage}} \times 100$$

TABLE 8

|  | Sensor output | Image surface roughness Ra (μm) | Scratch resistance | Image density | Glossiness | Blocking property | Maintenance property | Storage stability |
| --- | --- | --- | --- | --- | --- | --- | --- | --- |
| Ex. 1 | 700 | 0.55 | A | A | A | A | A | A |
| Ex. 2 | 650 | 0.7 | B | B | B | A | A | A |
| Ex. 3 | 800 | 0.35 | A | A | A | B | B | A |
| Ex. 4 | 620 | 0.8 | B | B | B | B | A | A |
| Ex. 5 | 850 | 0.3 | B | A | A | B | B | A |
| Ex. 6 | 640 | 0.6 | B | A | A | A | A | A |
| Ex. 7 | 600 | 0.6 | C | C | C | A | B | A |
| Ex. 8 | 650 | 0.6 | B | B | B | B | B | C |
| Ex. 9 | 600 | 0.9 | C | C | C | B | B | A |
| Ex. 10 | 600 | 0.2 | C | A | A | A | A | A |
| Ex. 11 | 640 | 0.4 | C | A | A | A | A | A |
| Ex. 12 | 680 | 0.4 | A | A | A | C | C | A |
| Ex. 13 | 700 | 0.55 | A | A | A | C | A | A |
| Ex. 14 | 720 | 0.5 | A | A | A | A | C | B |
| Ex. 15 | 650 | 0.9 | C | C | C | B | A | A |
| Ex. 16 | 670 | 0.9 | C | C | C | C | A | A |
| Ex. 17 | 720 | 0.43 | A | A | A | B | A | A |
| Ex. 18 | 700 | 0.6 | A | A | A | A | A | C |
| Comp. Ex. 1 | 580 | 0.9 | D | C | C | A | A | A |
| Comp. Ex. 2 | 530 | 0.6 | D | C | C | A | A | A |
| Comp. Ex. 3 | 520 | 0.5 | D | C | C | A | A | A |
| Comp. Ex. 4 | 630 | 0.7 | C | C | C | D | C | A |
| Comp. Ex. 5 | 620 | 0.8 | C | C | C | D | D | A |
| Comp. Ex. 6 | 610 | 0.9 | C | C | C | C | D | A |
| Comp. Ex. 7 | 700 | 0.5 | A | A | A | D | A | A |

From the results of Table 8, it was found that Examples 1 to 18 could provide an image with a more excellent scratch resistance, a more excellent glossiness, and a higher image density than could be provided by Comparative Examples 1 to 7, and that Examples 1 to 18 were more excellent in blocking property and nozzle maintenance property than Comparative Examples 1 to 7.

Aspects of the present invention are as follows, for example.

<1> An ink including:
at least one organic solvent;
polyurethane resin particles;
a colorant; and
water,
wherein the at least one organic solvent includes a compound having a saturated vapor pressure at 100° C. of 65 mmHg or greater but 400 mmHg or less, and
wherein a sensor output at a critical image peeling point, measured by a microscratching method, of a solid image formed on a print medium in a manner that the ink is attached in an amount of 0.96 mg/cm$^2$ is 600 or greater.

<2> The ink according to <1>,
wherein an arithmetic mean roughness Ra of the solid image is 0.3 μm or greater but 0.8 μm or less.

<3> The ink according to <1> or <2>,
wherein a glass transition temperature of the polyurethane resin particles is −30° C. or higher but 10° C. or lower.

<4> The ink according to any one of <1> to <3>,
wherein a volume average particle diameter of the polyurethane resin particles is 8 nm or greater but 19 nm or less.

<5> The ink according to any one of <1> to <4>,
wherein a ratio by mass (A/B) of a content A (% by mass) of the polyurethane resin particles to a content B (% by mass) of the colorant is 1 or greater but 5 or less.

<6> The ink according to any one of <1> to <5>,
wherein a ratio by mass (C/A) of a content C (% by mass) of the compound having a saturated vapor pressure at 100° C. of 65 mmHg or greater but 400 mmHg or less to a content A (% by mass) of the polyurethane resin particles is 0.85 or greater but 3.0 or less.

<7> The ink according to any one of <1> to <6>,
wherein the compound having a saturated vapor pressure at 100° C. of 65 mmHg or greater but 400 mmHg or less is at least one selected from the group consisting of propylene glycol monopropylether, propylene glycol monomethylether, and 3-methoxybutanol.

<8> The ink according to any one of <1> to <7>,
wherein a content of the compound having a saturated vapor pressure at 100° C. of 65 mmHg or greater but 400 mmHg or less is 10% by mass or greater but 25% by mass or less.

<9> The ink according to any one of <1> to <8>,
wherein the sensor output is 600 or greater but 1,000 or less.

<10> The ink according to any one of <1> to <9>, further including
an organic solvent having a solubility parameter (SP value) in a range of from 11.0 through 14.0.

<11> The ink according to any one of <1> to <10>,
wherein a content of the at least one organic solvent is 15% by mass or greater but 60% by mass or less.

<12> The ink according to any one of <1> to <11>,
wherein a weight average molecular weight of the polyurethane resin particles is in a range of from 5,000 through 500,000.

<13> The ink according to any one of <1> to <12>,
wherein the print medium is coated paper for printing.

<14> An ink stored container including:
the ink according to any one of <1> to <13>; and
a container storing the ink.
<15> An inkjet printing method including
an ink discharging step of applying a stimulus to the ink according to any one of <1> to <13> to discharge the ink to print an image on a print medium.
<16> The inkjet printing method according to <15>,
wherein the print medium is coated paper for printing.
<17> An inkjet printing apparatus including
an ink discharging unit configured to apply a stimulus to the ink according to any one of <1> to <13> to discharge the ink to print an image on a print medium.
<18> The inkjet printing apparatus according to <17>,
wherein the print medium is coated paper for printing.
<19> A printed matter including:
a print medium; and
an image formed on the print medium with the ink according to any one of <1> to <13>.
<20> The printed matter according to <19>,
wherein the print medium is coated paper for printing.

What is claimed is:

1. A set of an ink and a print medium, the set comprising:
an ink; and
a print medium,
wherein the ink comprises:
at least one organic solvent;
polyurethane resin particles;
a colorant; and
water,
wherein the at least one organic solvent comprises a compound having a saturated vapor pressure at 100° C. of 65 mmHg or greater but 400 mmHg or less,
wherein a glass transition temperature of the polyurethane resin particles is −30° C. or higher but 10° C. or lower, and
wherein a sensor output at a critical image peeling point, measured by a microscratching method, of a solid image formed on the print medium in a manner that the ink is attached in an amount of 0.96 mg/cm$^2$ is 600 or greater.

2. The set according to claim 1, wherein an arithmetic mean roughness Ra of the solid image is 0.3 μm or greater but 0.8 μm or less.

3. The set according to claim 1, wherein a volume average particle diameter of the polyurethane resin particles is 8 nm or greater but 19 nm or less.

4. The set according to claim 1, wherein a mass ratio A/B is 1 or greater but 5 or less, where A is a mass percentage of the polyurethane resin particles and B is a mass percentage of the colorant.

5. The set according to claim 1, wherein a mass ratio C/A is 0.85 or greater but 3.0 or less, where C is a mass percentage of the compound having a saturated vapor pressure at 100° C. of 65 mmHg or greater but 400 mmHg or less and A is a mass percentage of the polyurethane resin particles.

6. The set according to claim 1, wherein the compound having a saturated vapor pressure at 100° C. of 65 mmHg or greater but 400 mmHg or less comprises at least one selected from the group consisting of propylene glycol monopropylether, propylene glycol monomethylether, and 3-methoxybutanol.

7. The set according to claim 1, wherein a content of the compound having a saturated vapor pressure at 100° C. of 65 mmHg or greater but 400 mmHg or less is 10% by mass or greater but 25% by mass or less.

8. An inkjet printing method, comprising
applying a stimulus to an ink to discharge the ink to print an image on a print medium,
wherein the ink and the print medium are the ink and the print medium included in the set according to claim 1.

9. An inkjet printing apparatus, comprising:
the set according to claim 1; and
an ink discharging unit configured to apply a stimulus to the ink to discharge the ink to print an image on the print medium.

10. A printed matter, comprising:
a print medium; and
a print layer,
wherein the print layer comprises:
at least one organic solvent;
polyurethane resin particles; and
a colorant,
wherein the at least one organic solvent comprises a compound having a saturated vapor pressure at 100° C. of 65 mmHg or greater but 400 mmHg or less,
wherein a glass transition temperature of the polyurethane resin particles is −30° C. or higher but 10° C. or lower, and
wherein a sensor output at a critical image peeling point, measured by a micro scratching method, of a solid image formed on the print medium in a manner that the ink is attached in an amount of 0.96 mg/cm$^2$ is 600 or greater.

11. An ink, comprising:
at least one organic solvent;
polyurethane resin particles;
a colorant; and
water,
wherein the at least one organic solvent comprises a compound having a saturated vapor pressure at 100° C. of 65 mmHg or greater but 400 mmHg or less,
wherein a glass transition temperature of the polyurethane resin particles is −30° C. or higher but 10° C. or lower,
wherein a sensor output at a critical image peeling point, measured by a microscratching method, of a solid image formed on a print medium in a manner that the ink is attached in an amount of 0.96 mg/cm$^2$ is 600 or greater, and
wherein the ink is used in an inkjet printing method that comprises applying a stimulus to the ink to discharge the ink to print an image on the print medium.

12. An ink stored container, comprising:
the ink according to claim 11; and
a container storing the ink.

* * * * *